United States Patent
Nakamura

(10) Patent No.: US 7,792,373 B2
(45) Date of Patent: Sep. 7, 2010

(54) IMAGE PROCESSING APPARATUS, IMAGE PROCESSING METHOD, AND IMAGE PROCESSING PROGRAM

(75) Inventor: Takeshi Nakamura, Saitama (JP)

(73) Assignee: Pioneer Corporation, Tokyo (JP)

( * ) Notice: Subject to any disclaimer, the term of this patent is extended or adjusted under 35 U.S.C. 154(b) by 851 days.

(21) Appl. No.: 11/662,267

(22) PCT Filed: Sep. 7, 2005

(86) PCT No.: PCT/JP2005/016457

§ 371 (c)(1), (2), (4) Date: Mar. 9, 2007

(87) PCT Pub. No.: WO2006/028156

PCT Pub. Date: Mar. 16, 2006

(65) Prior Publication Data

US 2008/0095451 A1 Apr. 24, 2008

(30) Foreign Application Priority Data

Sep. 10, 2004 (JP) ............................. 2004-263696

(51) Int. Cl.
*G06K 9/36* (2006.01)
*G06K 9/46* (2006.01)
*H04N 7/12* (2006.01)

(52) U.S. Cl. ..................... 382/238; 375/240.12
(58) Field of Classification Search .............. None
See application file for complete search history.

(56) References Cited

U.S. PATENT DOCUMENTS

| | | | | |
|---|---|---|---|---|
| 5,774,593 A | * | 6/1998 | Zick et al. | 382/236 |
| 5,911,008 A | * | 6/1999 | Niikura et al. | 382/236 |
| 5,926,225 A | | 7/1999 | Fukuhara et al. | |
| 6,735,253 B1 | * | 5/2004 | Chang et al. | 375/240.16 |
| 7,027,509 B2 | * | 4/2006 | Jun et al. | 375/240.16 |
| 7,672,378 B2 | * | 3/2010 | Ng et al. | 375/240.26 |
| 2001/0021268 A1 | * | 9/2001 | Jun et al. | 382/165 |
| 2004/0125124 A1 | * | 7/2004 | Kim et al. | 345/716 |
| 2004/0146211 A1 | * | 7/2004 | Knapp et al. | 382/236 |
| 2006/0061602 A1 | * | 3/2006 | Schmouker et al. | 345/660 |
| 2007/0258009 A1 | * | 11/2007 | Kanda et al. | 348/416.1 |

FOREIGN PATENT DOCUMENTS

| | | |
|---|---|---|
| GB | 2 388 267 A | 11/2003 |
| JP | 7-193748 A | 7/1995 |
| JP | 8-186789 A | 7/1996 |
| JP | 9-187015 A | 7/1997 |
| JP | 9-294277 A | 11/1997 |
| JP | 10-257436 A | 9/1998 |
| JP | 2001-054106 A | 2/2001 |
| JP | 2002-185969 A | 6/2002 |
| JP | 2002-271798 A | 9/2002 |
| JP | 2003-333602 A | 11/2003 |

* cited by examiner

*Primary Examiner*—Yuzhen Ge
(74) *Attorney, Agent, or Firm*—Foley & Lardner LLP

(57) ABSTRACT

A target image of coding is separated into sequences of a plurality of frames, that is, shots, and differences between the shots and shots similar to the shots are coded (reference frames for each frame in the target shot of coding are frames corresponding thereto in a shot similar to the target shot). As shown in the figure, for example, a shot "A3" refers to a similar shot "A0" (prediction) and "A1" or "A2" refers to both shots "A0" and "A3" (bidirectional prediction), respectively for coding.

24 Claims, 25 Drawing Sheets

FIG.6

| | REFERENCE SIMILAR SHOT GENERATING INFORMATION |
|---|---|
| METHOD 1 | <INFORMATION ON REFERENCE SIMILAR SHOT><br>· STARTING TIME SR<br>· DURATION DR<br><INFORMATION ON ORIGINAL SIMILAR SHOT><br>· SHOT ID |
| METHOD 2 | <INFORMATION ON REFERENCE SIMILAR SHOT><br>· STARTING TIME SR<br>· DURATION DR<br><INFORMATION ON ORIGINAL SIMILAR SHOT><br>· SHOT ID<br>· STARTING TIME SO<br>· DURATION DO |
| METHOD 3 | Loop{<br>  <INFORMATION ON REFERENCE SIMILAR SHOT><br>    · STARTING TIME SRn<br>    · DURATION DRn<br>  <INFORMATION ON ORIGINAL SIMILAR SHOT><br>    · SHOT ID<br>    · STARTING TIME SOn<br>    · DURATION DOn<br>} |
| METHOD 4 | Loop{<br>  <INFORMATION ON REFERENCE SIMILAR SHOT><br>    · STARTING TIME SRn<br>    · DURATION DRn<br>  Loop{<br>    <INFORMATION ON ORIGINAL SIMILAR SHOT><br>      · SHOT ID<br>      · STARTING TIME SOn<br>      · DURATION DOn<br>    <INFORMATION ON WEIGHT><br>      · WEIGHT COEFFICIENT<br>  }<br>} |
| METHOD 5 | Loop{<br>  · REFERENCE SIMILAR SHOT GENERATING METHOD ID<br>      ⋮<br>} |

⟨GLOBAL MOTION COMPENSATION PREDICTION⟩

⟨BLOCK MOTION COMPENSATION PREDICTION⟩

IMAGE PROCESSING APPARATUS, IMAGE PROCESSING METHOD, AND IMAGE PROCESSING PROGRAM

TECHNICAL FIELD

The present invention relates to an image processing apparatus, an image processing method, and an image processing program for coding or decoding video images. It is to be noted that the utilization of the present invention is not limited to the image processing apparatus, the image processing method, and the image processing program described above.

BACKGROUND ART

As conventional techniques for the structuring of video images (in concrete terms, sorting of frames, layering by individual shots) in order for the various purposes such as the improvement of coding efficiency, diversification of access methods to video images, facilitation of video image browsing, and simplification of file format exchange, those inventions in the following Patent Documents 1 to 5 have been available.

In a conventional technique described in Patent Document 1, a file framing unit generates editing information that indicates the sorting order of video image data as individual frames. Moreover, an image compressing unit compresses and encodes unedited video image data based on the differences from the former frame and transmits the encoded data with the editing information from an output unit.

In a conventional technique described in Patent Document 2, predictive-coded image data stored in an image data string memory is read out, and the data is separated into layers by a layer separation unit based on the architecture of the layered data. The physical features of image data, i.e., such features possessing generality and reflecting a content, are extracted from separated layers by an image feature extracting unit. Feature vectors that characterize individual images are generated by a feature vector generating unit based on these physical features. After calculating the distances between feature vectors, the feature vectors are automatically structured into a deep-layered architecture through separation/integration process by a separation/integration unit and then stored and managed by a feature vector managing unit.

A conventional technique described in Patent Document 3 is an automatic layering method for video image data in which a scene extracting process is performed in which video images are coded, the coded video images are then separated into individual shots, and the separated shots are integrated to extract scenes by using the similarities of each shot. This technique is also according to a browsing method of video images, which is characterized by facilitated seizing of an entire content of video image and facilitated detection of a desired scene or a shot by using layered data.

In a conventional technique described in Patent Document 4, while multiple-channel image data taken by multiple cameras are switched in proper sequence by a switching unit and are sorted per GOP unit at every channel by a sorting unit and are recorded on a storage unit after being compressed by an MPEG compression unit, the plurality of-channel image data are reduced in file size after being expanded at every channel by an MPEG expansion unit and are stored in a designated position of multiple display memories in the sequence of input at every channel so as to be displayed on multiple screens and are then reproduced and displayed as multiple screen images on a single screen of a monitor.

In a conventional technique described in Patent Document 5, a reproduced video image signal A2 and side information A3, which are obtained by decoding a bit stream A1 in MPEG-2 format as a primary video image coding data format by an MPEG-2 decoder, are transformed into a suitable form for MPEG-4 format as a secondary video image coding data format by a size transformation unit. A bit stream A6 in MPEG-4 format is obtained by coding a transformed reproduced image signal A4 at an MPEG-4 encoder by using motion vector information included in transformed side information A5, and a structuring data A7 is obtained through an indexing process at an indexing unit by using motion vectors included in the side information A5.

Patent Document 1: Japanese Patent Application Laid-open Publication No. H8-186789

Patent Document 2: Japanese Patent Application Laid-open Publication No. H9-294277

Patent Document 3: Japanese Patent Application Laid-open Publication No. H10-257436

Patent Document 4: Japanese Patent Application Laid-open Publication No. 2001-054106

Patent Document 5: Japanese Patent Application Laid-open Publication No. 2002-185969

DISCLOSURE OF INVENTION

Problem to be Solved by the Invention

Various predictive systems have previously been proposed for improving video image coding efficiency. For example, coding efficiencies are improved by adopting predictive frames (P frames) and/or bidirectional predictive frames (B frames) in MPEG-1, field prediction in MPEG-2, sprite coding and/or GMC (Global Motion Compensation) in MPEG-4 part 2, and multiple reference frames in ITU-T H.264/MPEG-4 part 10 (AVC: Advanced Video Coding), respectively.

In general, mutually similar shots (sequences of a plurality of frames) as shown in the following examples are included among target images for coding.

bust shot of a news caster in a news program throwing/batting scenes in baseball, service scene in tennis, descent/flying scenes in ski jumping, etc.

repetition of a highlight scene in a sport program repetition of the same shot before and after a CM in a variety show program close-up shots of individual actors for the repetition of the alternating close-up shots of a conversation scene by two persons regular opening or ending or retrospect scenes in a serial drama repetition of the same CM Not only the repetition of the same shot, shots to the same angle from a fixed camera often result in similar shots. For such the similar shots, it is expected to reduce a coding volume as a whole by coding the difference between each two shots after referring one shot from another rather than coding each shot independently.

In conventional MPEG, however, as the architecture of the entire target image, e.g., repetition of similar shots described above, has not been utilized for coding (in other words, without utilizing the redundancy of information volume between similar shots) but commonly, coding has been done along a time series, there has been a problem such as low coding efficiency.

Means for Solving Problem

To solve the above problems and to achieve an object, the image processing apparatus as described herein includes a shot separating unit that separates a video image into a plurality of shots composed of sequences of a plurality of frames; a shot detecting unit that detects a second shot that is similar to a first shot to be coded among shots separated by the shot separating unit; a shot generating unit that generates a third shot by modifying a length of time of the second shot that is detected by the shot detecting unit; and a coding unit that encodes a difference between the first shot and the third shot that is generated by the shot generating unit.

Moreover, the image processing apparatus as described herein includes a shot decoding unit that decodes coded data of a first shot among coded data of a video image, that is composed of sequences of a plurality of frames; a shot generating unit that generates a third shot by modifying the length of time of a second shot, that is similar to the first shot and that is included in the video image, by a method specified by shot generating information included in the coded data of the video image; and a shot adding unit that adds coded data after being decoded by the shot decoding unit and a third shot generated by the shot generating unit.

Furthermore, the image processing method as described herein includes a shot separating step of separating a video image into a plurality of shots composed of sequences of a plurality of frames; a shot detecting step of detecting a second shot that is similar to a first shot to be coded among shots separated at the shot separating step; a shot generating step of generating a third shot by modifying the length of time of the second shot that is detected at the shot detecting step; and a coding step of coding a difference between the first shot and the third shot that is generated at the shot generating step.

Moreover, the image processing method as described herein—includes a shot decoding step of decoding coded data of a first shot among coded data of a video image, that is composed of sequences of a plurality of frames; a shot generating step of generating a third shot by modifying the length of time of a second shot, that is similar to the first shot and that is included in the video image, by a method specified by shot generating information included in the coded data of the video image; and a shot adding step of adding coded data after being decoded by the shot decoding step and a third shot generated at the shot generating step.

Furthermore, the image processing program as described herein causes a processor to execute a shot separating step of separating a video image into a plurality of shots composed of sequences of a plurality of frames; a shot detecting step of detecting a second shot that is similar to a first shot to be coded among shots separated at the shot separating step; a shot generating step of generating a third shot by modifying the length of time of the second shot that is detected at the shot detecting step; and a coding step of coding a difference between the first shot and the third shot that is generated at the shot generating step.

Moreover, the image processing program as described herein causes a processor to execute a shot decoding step of decoding coded data of a first shot among coded data of a video image, that is composed of sequences of a plurality of frames; a shot generating step of generating a third shot by modifying the length of time of a second shot, that is similar to the first shot and that is included in the video image, by a method specified by shot generating information included in the coded data of the video image; and a shot adding step of adding coded data after being decoded by the shot decoding step and a third shot generated at the shot generating step.

BRIEF DESCRIPTION OF DRAWINGS

FIG. 6 an explanatory diagram schematically showing specific examples of information on reference similar shot generation;

EXPLANATIONS OF LETTERS OR NUMERALS

1300, 1400, 1800, 1900 transforming unit
1301, 1401, 1801, 1901 quantizing unit
1302, 1402, 1802, 1902 entropy coding unit
1303, 1403, 1803, 1903 coding control unit
1304, 1404, 1601, 1804, 1904, 2601 inverse quantizing unit
1305, 1405, 1602, 1805, 1905, 2602 inverse transforming unit
1306, 1603, 1806, 2603 original similar shot memory
1307, 1807 shot separating unit
1308, 1808 similar shot detecting unit
1309, 1809 generating method determining unit
1310, 1604, 1810, 2604 reference similar shot generating unit
1406, 1906 reference frame memory
1600, 2600 entropy coding unit
1811, 1907 inter-frame motion detecting unit
1812, 1908, 2605 inter-frame motion compensation unit
2800, 2900 encoder
2801, 2901 multiplication unit
3000, 3100 decoder
3001, 3101 separation-multiplication unit

BEST MODE(S) FOR CARRYING OUT THE INVENTION

Exemplary embodiments of an image processing apparatus, an image processing method, and an image processing program according to the present invention is explained below in detail with reference to the accompanying drawings.

EMBODIMENTS

In brief, the present invention is to separate target images for coding into a plurality of sequential frames, in other words, shots, and the differences between a shot and a shot similar to the shot (frames in a shot similar to the target shot corresponding to each frame in an target shot for coding are used as reference frames) are coded. Generally, as constituent frames of shots are also mutually similar between similar shots, values of the differences between frames are expected to concentrate near zero. Therefore, reduction of the coding volume is expected compared to the conventional techniques in which reference frames are determined based simply on the distance from a target frame for coding.

Figure 1:
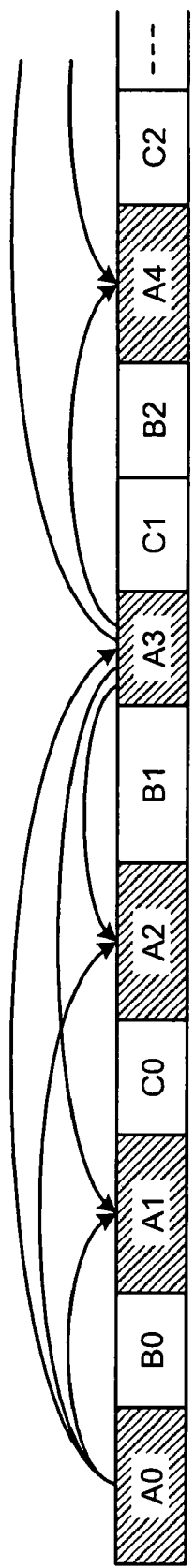
FIG. 1 is an explanatory diagram showing a referring relationship among shots separated and classified according to the present invention.

FIG. 1 an explanatory diagram showing a referring relationship among shots separated and classified according to the present invention. In an example illustrated in the figure, mutually similar shots within an image is categorized into three groups A, B, and C (similar shot group), and in group A, for example, a shot "A3" refers to shot "A0" (prediction) and "A1" or "A2" refers to both "A0" and "A3" (bidirectional prediction), and those shots are coded subsequently. The number of reference shots is not limited, and both passed shots (shots at previous points of time) and future shots (shots at later points of time) are both adoptable. Therefore, coding/decoding sequence does not necessarily follow a time series, in other words, does not coincide with appearing order in a video image.

The separating points of shots are, for example, the changing points of image feature and/or the changing points of background sound feature in the video image. As the changing points of image feature, screen changes (scene changes, cut points) or the changing points of camerawork (changing points such as scene change/panning/zooming/still) are to be examples. However, determination and/or specification of changing points (in other words, how to compose shots) are beyond the coverage of the present invention.

Although a calculation method of similarities among shots is not specified in the present invention either. In this example, a feature vector X is calculated for individual shots, and a Euclidean distance between feature vectors is regarded as the similarity among shots.

Figure 2:
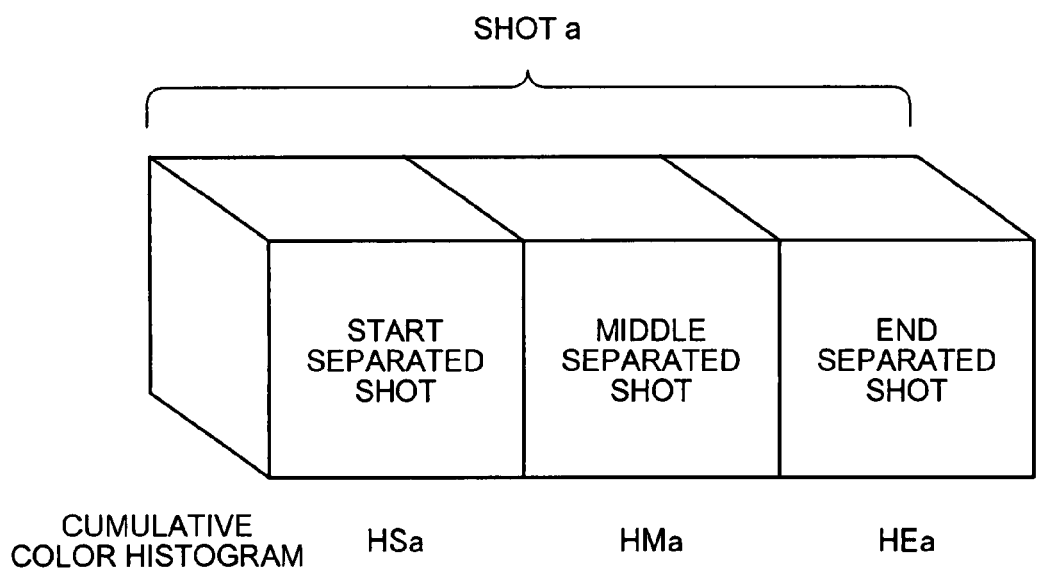
FIG. 2 is an explanatory diagram schematically showing a feature amount of each shot that constitutes the basis of a feature vector.

For example, the feature vector Xa of a shot a is regarded as a multidimensional vector that contains an element as cumulative color histogram of individual partial shots obtained by separating the shot a into N pieces. When N=3 as shown in FIG. 2, $X=\{HSa, HMa, HEa\}$ Where HSa: a cumulative color histogram of "start separated shot" in the figure, HMa: a cumulative color histogram of "middle separated shot" in the figure, and HEa: a cumulative color histogram of "end separated shot" in the figure.

HSa, HMa, and HEa themselves are also multidimensional feature vectors.

The "color histogram" represents a count of the total number of pixels appearing in each region within a frame after a color space is divided into a plurality of regions. As a color space, for example, RGB (R/red, G/green, B/blue), the CbCr component of YCbCr (Y/luminance, CbCr/color difference), and the Hue component of HSV (Hue, Saturation, Value) are utilized. It is also possible to compare images of different sizes by normalizing a histogram obtained by a pixel count within a frame. The "cumulative color histogram" is obtained by accumulating the normalized histogram for the entire frames within a shot.

A similarity $D_{a,b}$ between a shot a and a shot b is calculated by the following equation, for example, using feature vectors obtained above. Shots with a smaller value (smaller distance between feature vectors) represents higher similarity while shots with a larger value (larger distance between feature vectors) represents lower similarity. In the present invention, the improvement of coding efficiency is realized by grouping shots with similarity values smaller than a fixed threshold, and by coding the differences among shots within the same group for individual shots.

$$D_{a,b}=\|X_a-X_b\|$$ [Equation 1]

Figure 3:
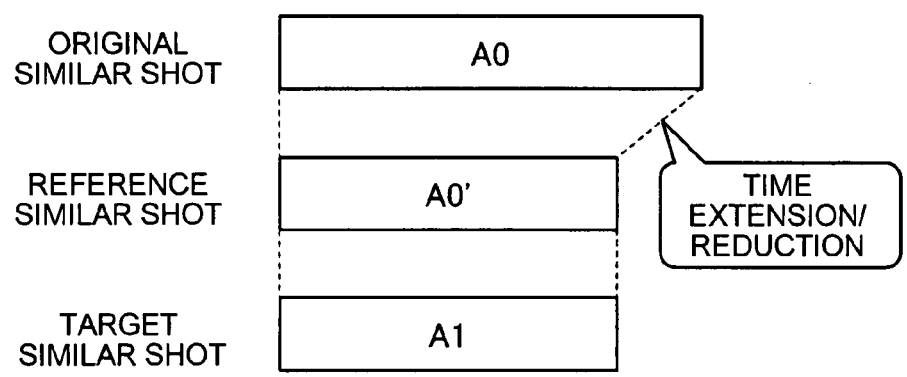
FIG. 3 is an explanatory diagram schematically showing a relationship among an "original similar shot", a "reference similar shot", and a "target similar shot"

However, it is not possible to simply calculate the difference between a target shot for coding and a reference shot thereof as the durations of them are not necessarily the same. Specifically, the duration of the latter shot needs to be compensated to correspond with that of the former by extension or reduction of the duration. In the present invention, an uncompensated shot is referred to as "original similar shot", and a shot that is generated from an original similar shot through the compensation and that is then subtracted from an target shot for coding (hereinafter, "target similar shot") is referred to as "reference similar shot". A typical relationship among "original similar shot", "reference similar shot", and "target similar shot" is shown in FIG. 3.

Although the compensation method includes the following two cases of with or without frame position compensation (interpolation or thinning of frames), the above method of compensation is not regulated by the followings.

Figure 4:
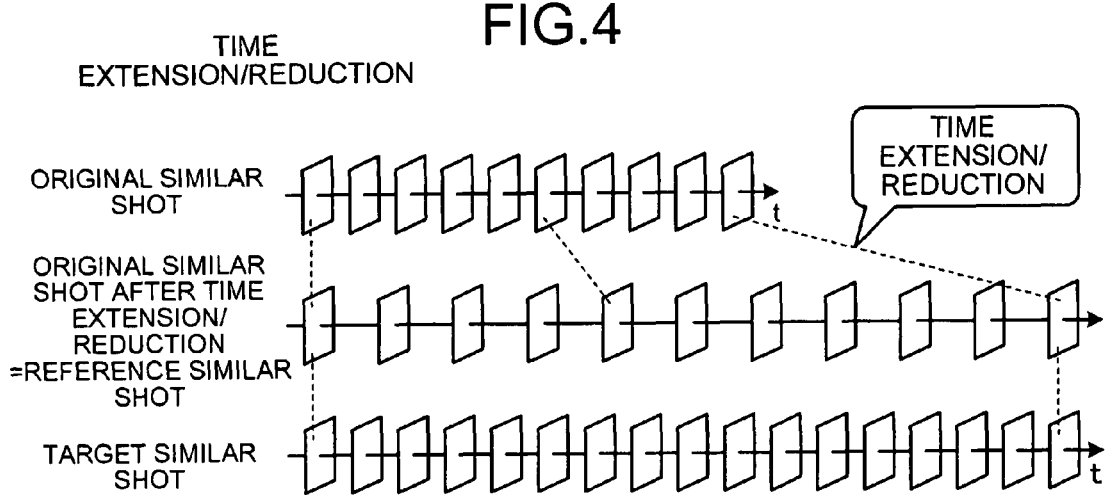
FIG. 4 is an explanatory diagram schematically showing a method of duration compensation of original similar shots (without frame position compensation)

(Duration Compensation for Original Similar Shot Method 1) without Frame Position Compensation As shown in FIG. 4, the intervals of original similar shot frames are changed, i.e., a method that simply changes apparent duration of an original similar shot without modification of frames within the shot. Although the process of time elongation/compaction is simple in this method, as the frame positions of the reference similar shot and the target similar shot are not correspondent, subsequent processes need to include appropriate adjustment for the gap of frame position.

Figure 5:
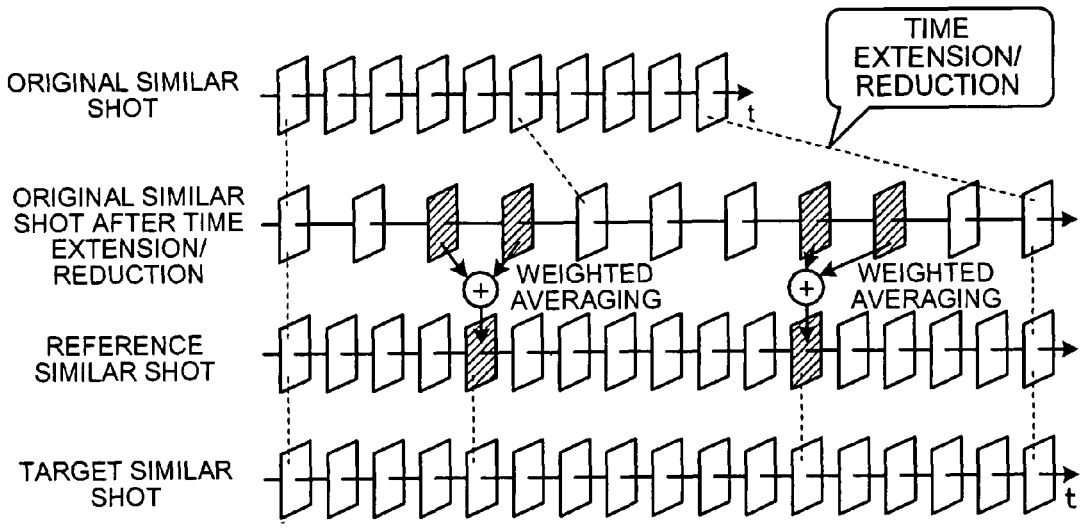
FIG. 5 is an explanatory diagram schematically showing a method of duration compensation of original similar shots (with frame position compensation)

(Duration Compensation for Original Similar Shot Method 2) with Frame Position Compensation As shown in FIG. 5, after the duration of original similar shot is extended/reduced as is in the method 1, frames are interpolated at positions corresponding to those in the reference similar shot. For example, the weighted average of two frames of original similar shot that are located before and behind a target frame of target similar shot are calculated and a resultant frame is interpolated at a position corresponding with a target frame. Although a process in this method is complicated as modification of entire frames in original similar shot is required, subsequent processes are simple comparisons between frames at the same positions as the frame positions of the reference similar shot and the target similar shot correspond as shown in the figure.

While any shot and any portion of the shot of original similar shot that is similar to target similar shot can be utilized for generating reference similar shot, the following five methods are introduced here, for example. Specific examples of reference shot generating information that is necessary for decoding (need to be integrated into a coding stream) when reference similar shot is generated by each method are shown in FIG. 6.

(Reference Similar Shot Generation Method 1) Utilizing Entire Duration of Single Original Similar Shot As shown in FIG. 3, a reference similar shot is generated by extending or reducing the time of the entire duration of a single original similar shot in this method (FIG. 3 exemplifies time compaction). When this method is adopted, only an ID to identify an original similar shot used (original similar shot ID) is required as reference similar shot generating information. The rate of extension or reduction is uniformly determined by the ratio of duration between an original similar shot and a target similar shot.

Figure 7:
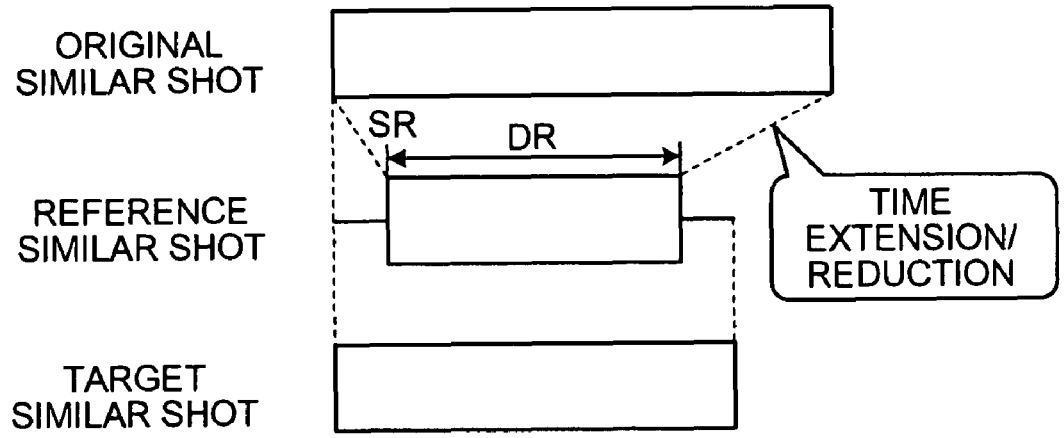
FIG. 7 is an explanatory diagram schematically showing a method of generating reference similar shots (by using the full range of a single original similar shot)

However, it is not necessary to predictive-code the entire duration of the target similar shot from the reference similar shot. As shown in FIG. 7, for example, it is permissible to partially generate the reference similar shot only for an interval having good matching with the original similar shot as all corresponding frames do not necessarily have good similarity even between similar shots. In this case, those frames in the intervals of the target similar shot that do not have corresponding reference similar shot are coded as they are (i.e., coded by intra coding without obtaining difference between their counterparts). While these intervals are supposed to have no reference similar shot, it is also possible to regard that they have a reference similar shot with values of zero for the entire interval.

When this method is adopted, starting time SR and duration DR for defining the interval (from which point to which point) of the target similar shot for which the corresponding reference similar shot is to be generated, and the ID of original similar shot that is necessary for the generation of reference similar shot are necessary as reference similar shot generating information (refer to FIG. 6). The above case of FIG. 3 is a particular case of the case shown in FIG. 7 where an original similar shot ID is enough, since starting time SR=the starting of reference similar shot and duration DR=the duration of reference similar shot.

Figure 8:
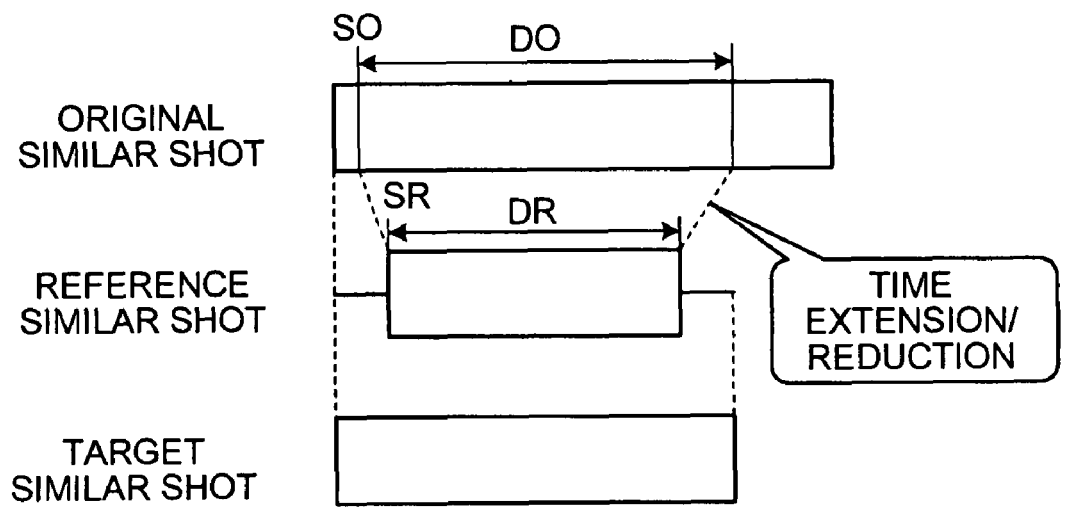
FIG. 8 is an explanatory diagram schematically showing a method of generating reference similar shots (by using a partial range of a single original similar shot)

(Reference Similar Shot Generation Method 2) Utilizing Partial Duration of Single Original Similar Shot As shown in FIG. 8, a reference similar shot is generated by extending or reducing the time of a partial duration of a single original similar shot in this method (FIG. 8 exemplifies time compaction). When this method is adopted, starting time SR and duration DR for defining the interval of the target similar shot for which corresponding reference similar shot is generated, the ID of original similar shot that is necessary for the generation of a reference similar shot, and starting time SO and duration DO for defining the interval of the original similar shot for which a corresponding reference similar shot is to be generated are necessary as a reference similar shot generating information (refer to FIG. 6).

Figure 9:
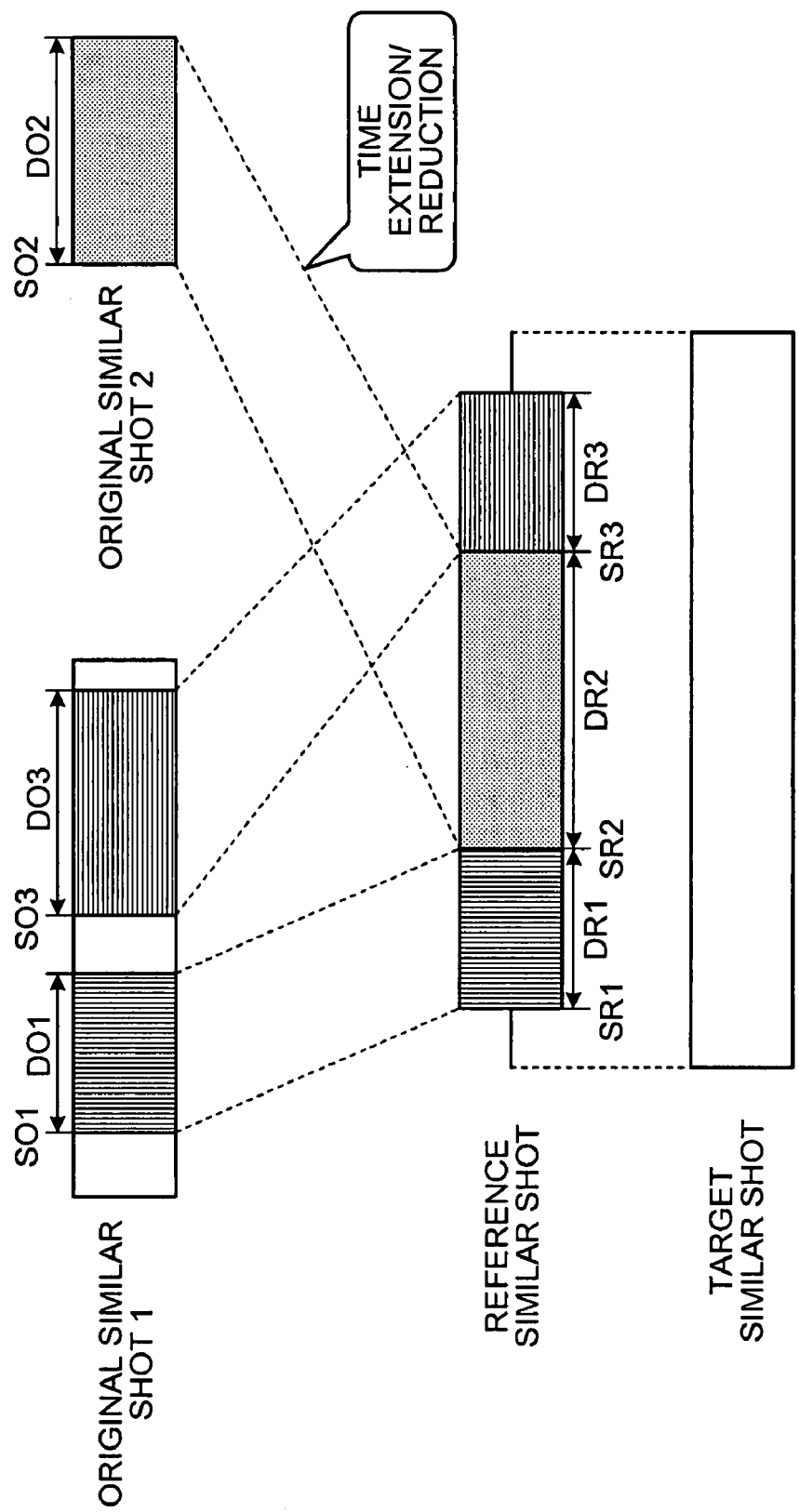
FIG. 9 is an explanatory diagram schematically showing a method of generating reference similar shots (by using multiple original similar shots)

(Reference Similar Shot Generation Method 3) Utilizing Multiple Original Similar Shots As shown in FIG. 9, partial reference similar shots are generated by extending or reducing the time of the entire or partial duration of a plurality of original similar shots in this method. In an example illustrated in the figure, partial durations of reference similar shot are generated by using partial durations of original similar shot 1 and the entire duration of the original similar shot 2. When this method is adopted, starting time SRn and duration DRn, original similar shot ID, and starting time SOn and duration DOn for each portion (three portions in the illustrated example) that constitutes the reference similar shot are necessary as reference similar shot generating information (refer to FIG. 6). The describing order of such information is desirable to correspond with the time sequence of each portion.

Figure 10:
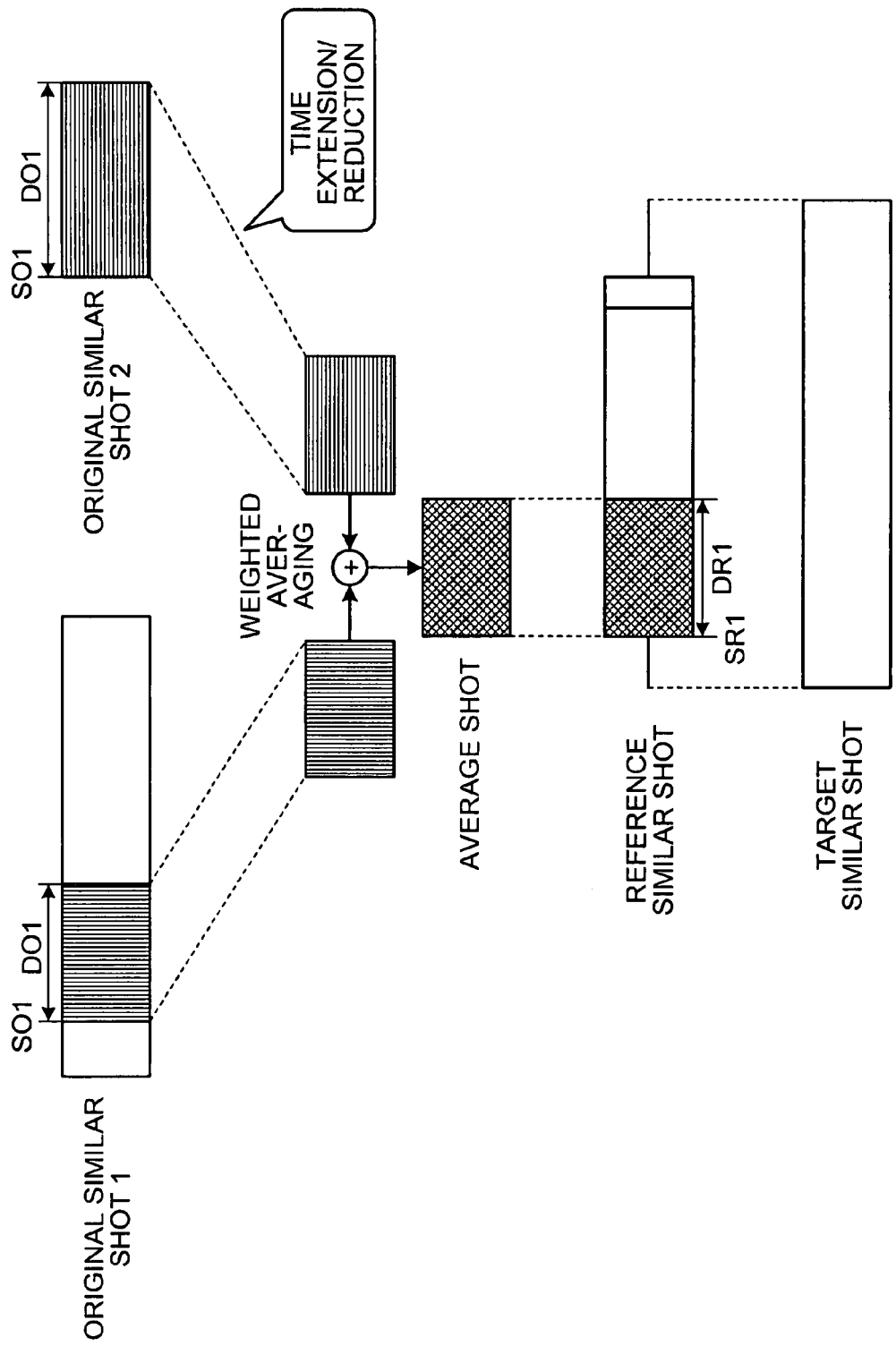
FIG. 10 is an explanatory diagram schematically showing a method of generating reference similar shot (by using the weighted mean of multiple original similar shots)

(Reference Similar Shot Generation Method 4) Utilizing Multiple Original Similar Shots After Weighted-Averaging In this method, as shown in FIG. 10, the entire or partial reference similar shots are generated from an "average shot" obtained by weighted-averaging the results of extension or reduction of the entire or partial duration of a plurality of original similar shots. In the example illustrated in the figure, the head portion of reference similar shot is generated by an average shot of the extended/reduced partial duration of original similar shot 1 and the elongated/compacted entire duration of original similar shot 2. Middle and end portions are also generated by a plurality (not necessarily two parts) of the averaged original similar shots. Weight coefficient can be either fixed for object shot for averaging or determined for individual frames. As weighted-averaging produces an ordinary average when the coefficient is equal among shots/frames, ordinary averaging is also regarded as a sort of weighted-averaging (a particular case of weighted average) in the present invention.

Figure 11:
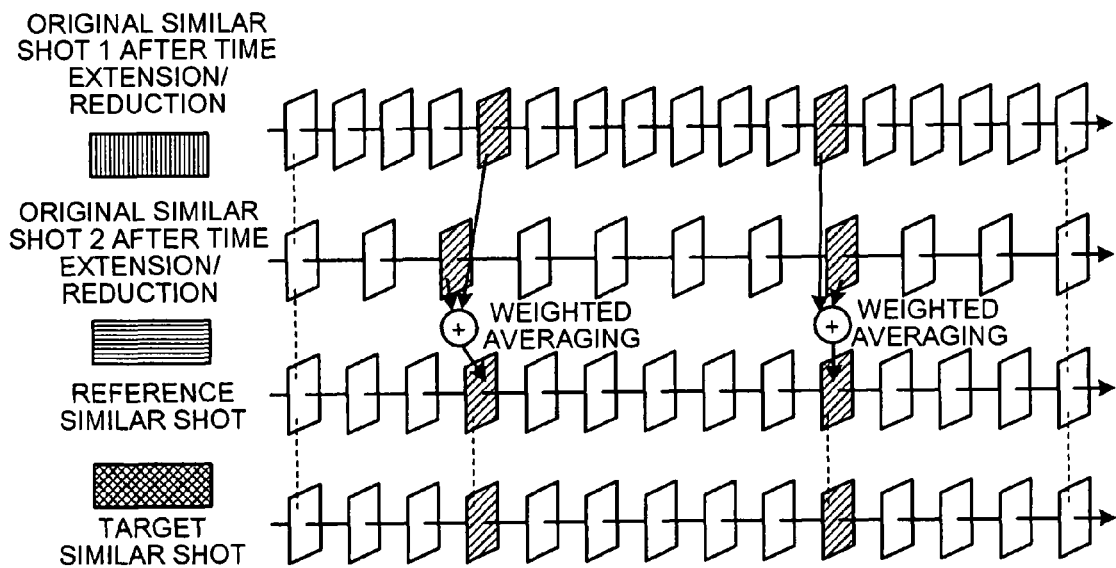
FIG. 11 is an explanatory diagram schematically showing an example of weighted mean calculation among shots at different frame positions.

When the frame positions of respective shots to be averaged correspond with each other, weighted average can be simply calculated by using frames at the same position. On the other hand, if the frame positions do not correspond with each other, reference similar shot that has the same frame positions as the target similar shot is generated by weighted-averaging two frames of each original shot nearest in time to a target frame of the target similar shot as shown in FIG. 11. Weight coefficient can be either fixed for the target shot for averaging or can be determined for individual frames (in the latter case, weight is determined depending on the distance to the target frames).

When this method is adopted, starting time SRn and duration DRn, IDs of the original similar shot to be origins of each portion, starting time Son, and duration DOn for each portion (three portions in the illustrated example) that constitutes the reference similar shot, and a coefficient for weighted-averaging are necessary as reference similar shot generating information (refer to FIG. 6). Crossfading is a specific example suitable to this method, for which a reference similar shot that has better matching with the target similar shot can be generated without the change of the original similar shot or the interval utilized but by simply changing a weight coefficient.

(Reference Similar Shot Generation Method 5) Combination of Methods 1 to 4

The best method among methods 1 to 4 is used to code each shot. In this case, reference similar shot generating information is required to include a method ID that indicates the method to generate a reference similar shot (refer to FIG. 6) in addition to the information required in each method (SRn, DRn, SOn, DOn, original similar shot ID, weight coefficient, etc.).

Figure 12:
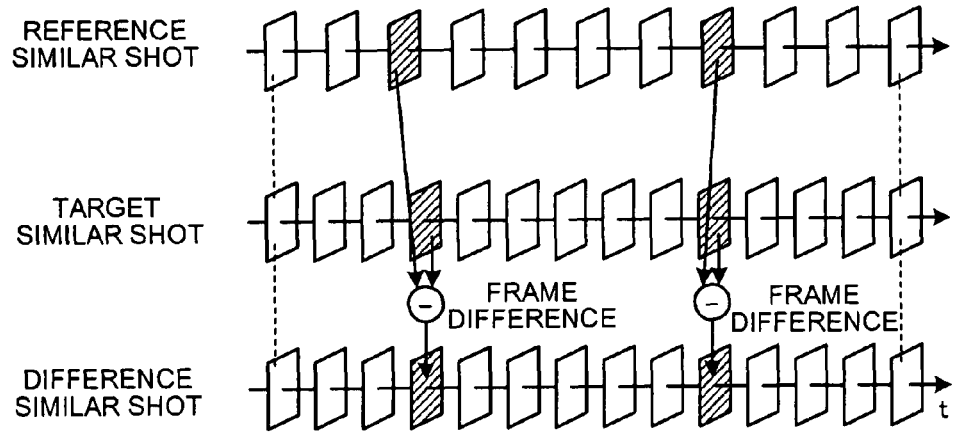
FIG. 12 is an explanatory diagram schematically showing an example of difference calculation among shots at different frame positions.

As described above, the outcome of the subtraction of the reference similar shot, which is generated by any of the above methods, from the target similar shot (hereinafter, "difference similar shot") is coded in the present invention. While differences can be simply obtained from frames at the same position if the frame positions of the target similar shot and the reference similar shot correspond with each other, differences are obtained between individual frames of the target similar shot and frames of the reference similar shot nearest in time to those frames as shown in FIG. 12 if frame positions do not correspond with each other.

First Embodiment

Figure 13:
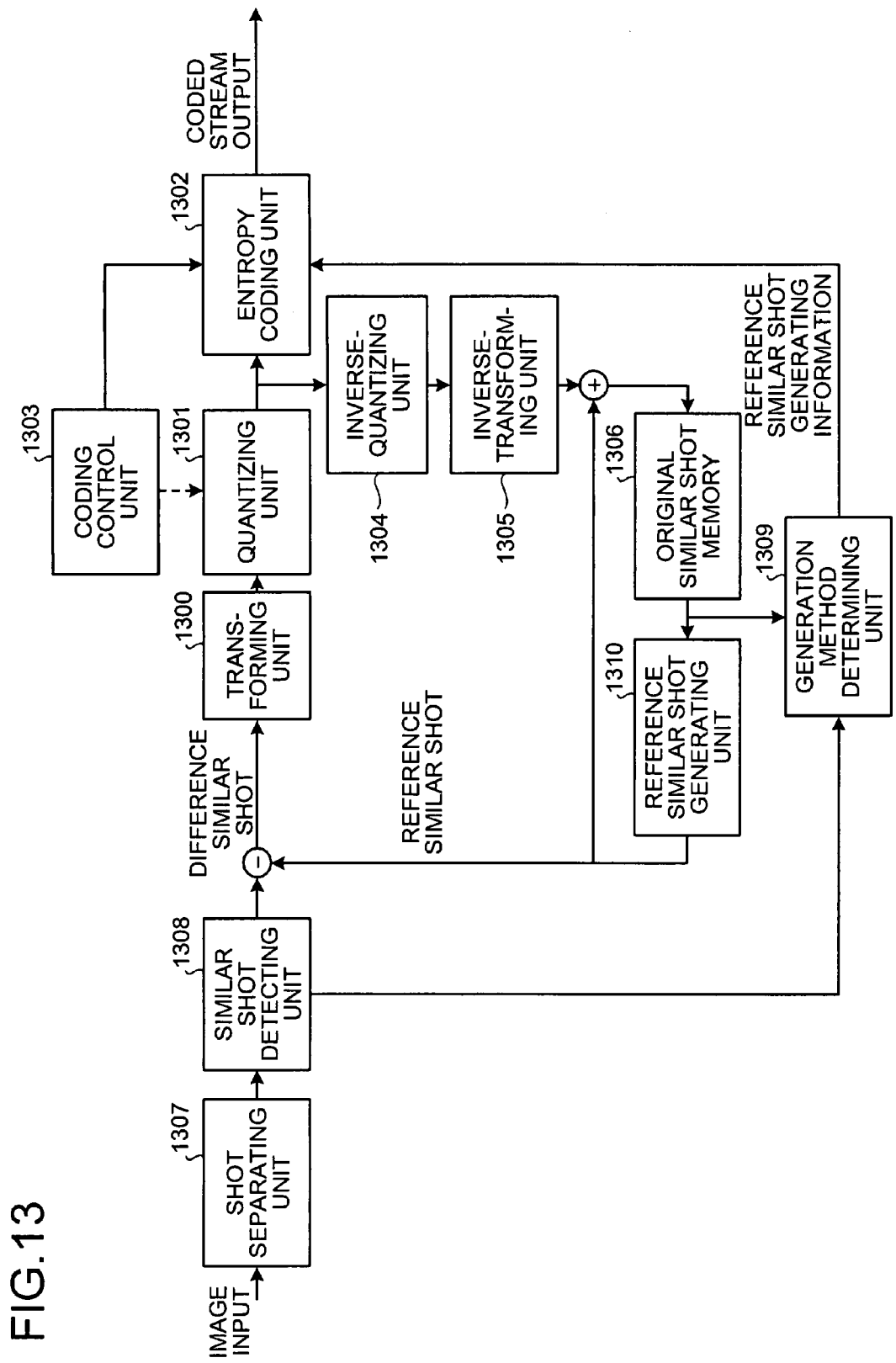
FIG. 13 is an explanatory diagram showing an example of a configuration of an image processing apparatus (encoder) according to a first embodiment of the present invention.
Figure 14:
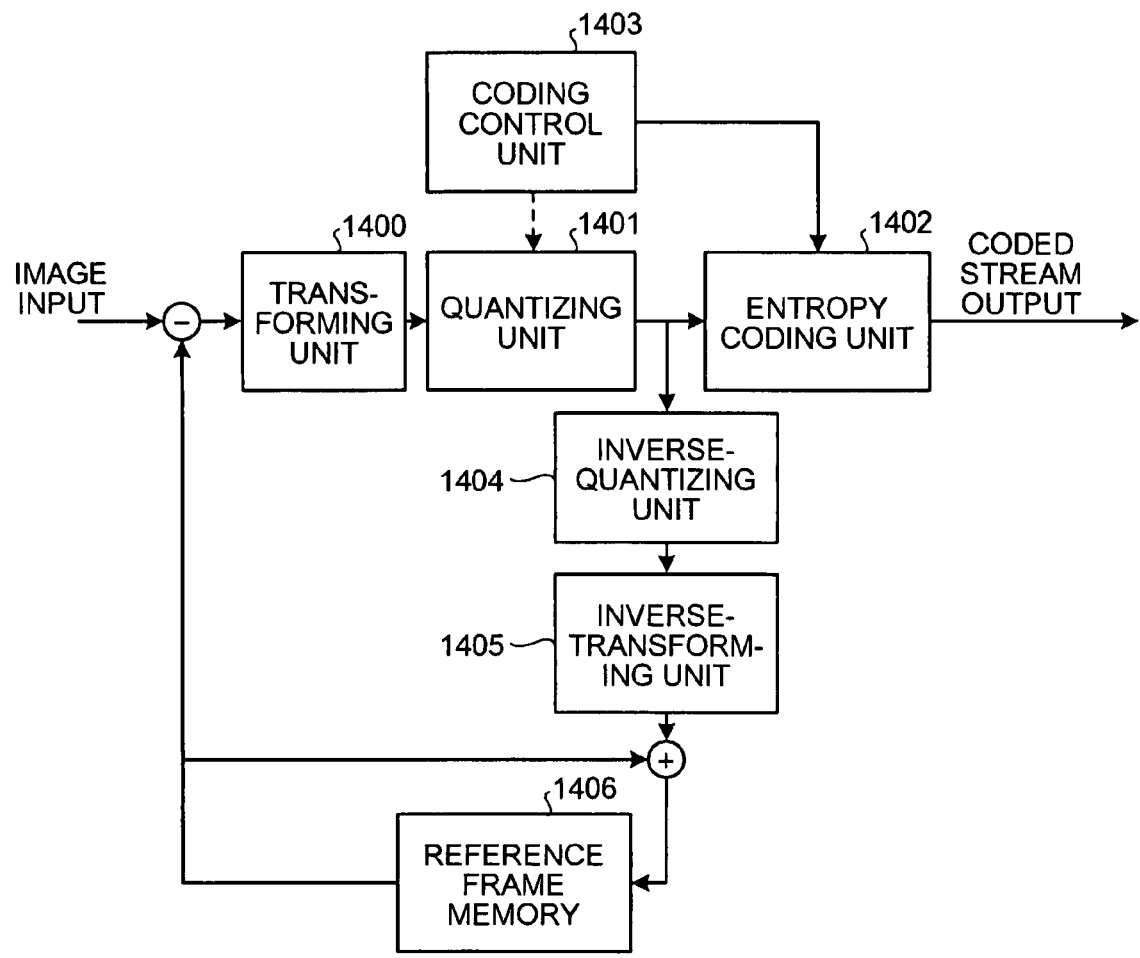
FIG. 14 is an explanatory diagram showing an example of a configuration of a JPEG/MPEG encoder according to the conventional techniques (without motion compensation)

FIG. 13 is an explanatory diagram showing an example of a configuration of an image processing apparatus (encoder) according to a first embodiment of the present invention. FIG. 14 is an explanatory diagram showing an example of a configuration of a JPEG/MPEG encoder according to the conventional techniques (without motion compensation).

In FIG. 13, numerals 1300 to 1305 denote equivalent to those having the same names in FIG. 14. Numerals 1300/1400 denote a transforming unit that performs discrete cosine transformation (DCT) and discrete wavelet transformation (DWT), etc. for a coding object frame (prediction error obtained by subtracting a reference frame from the coding object frame), numerals 1301/1401 denote a quantizing unit that quantizes transformed data at a designated step width, numerals 1302/1402 denote an entropy coding unit that encodes (with any appropriate coding) quantized data, etc., and numerals 1303/1403 denote a coding control unit that determines coding type, quantizing step, etc. Numerals 1304/1404 denote an inverse quantizing unit that inverse-quantizes quantized/encoded data, and numerals 1305/1405 denote an inverse transforming unit that inverse-transform inverse-quantized data.

Numeral 1306 denotes an original similar shot memory that retains local decode image, that is obtained by combining inverse-transformed frame and its reference frame, equivalent to, at least, one shot. A reference frame memory 1406 for retaining a local decode image is also shown in FIG. 14. While a reference frame memory in conventional techniques retains the above image per individual frame, the original similar shot memory 1306 in the present invention retains it per individual shot. The number of original similar shots (total frames included) to be retained at the original similar shot memory is practically limited by memory capacity, but no algorithmic limitation.

Numeral 1307 denotes a shot separating unit that has a function to separate coding object image into multiple shots. Numeral 1308 denotes a similar shot detecting unit that calculates similarity among each shot separated at the shot separating unit 1307, and that has a function to categorize the above shots into multiple groups (similar shot group) based on the similarity.

Numeral 1309 denotes a generating method determining unit that determines a method of generating reference similar shot (an interval of the target similar shot for that reference similar shot to be generated, an interval(s) of the original similar shot to be used for the generation, etc.) by comparing (matching) the target similar shot and the original similar shot retained in the original similar shot memory 1306. Although an optimal method, that is, a method that provides as many values of difference similar shots as possible drop in the vicinity of zero is sought for, procedures for the seeking is not particularly defined in the present invention. Apart from the similarity, color histogram or global motion information of entire frames or motion vector per block can be used as an evaluation index.

Numeral 1310 denotes a reference similar shot generating unit that generates reference similar shot from original similar shot retained at the original similar shot memory 1306 in accordance with a method determined by the generating method determining unit 1309.

Figure 15:
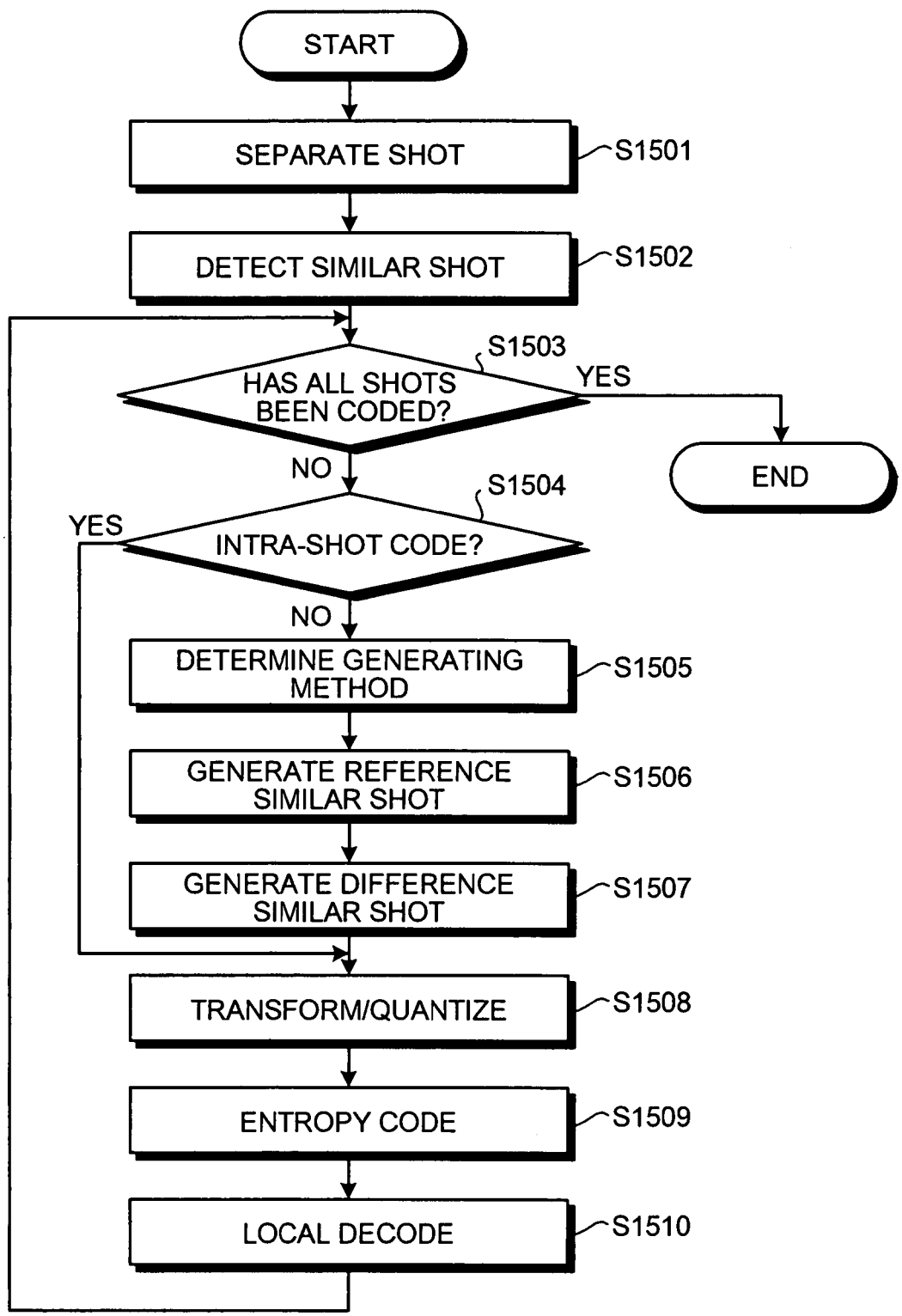
FIG. 15 is a flowchart showing a procedure of an image coding process by the image processing apparatus (encoder) according to the first embodiment of the present invention.

FIG. 15 is a flowchart showing a procedure of an image coding process by the image processing apparatus (encoder) according to the first embodiment of the present invention. Coding object image is separated into multiple shots at the shot separating unit 1307 (step S1501), and then similar shots of each shot are detected at the similar shot detecting unit 1308, that is, individual shots described above are classified into multiple groups based on similarities between shots (step S1502).

The device repeats the process of steps S1503 to 1510 while unprocessed (not yet encoded) shots remained (step S1503: NO). First, it is determined whether the target similar shot needs to be processed by the intra-shot coding, in other words, whether the shot is to be coded without reference to another shot.

Among multiple similar shots, at least one shot needs to be processed by intra-shot coding. For example, "A0" of group A in FIG. 1 corresponds to such a shot, and individual frames of the shot are transformed/quantized as they are at the transforming unit 1300/quantizing unit 1301 (step S1504: YES, step S1508), and are entropy coded at the entropy coding unit 1302 (step S1509). Post-transformation/quantization data is then local-decoded (inverse-quantized and inverse-transformed) by the inverse quantizing unit 1304 and the inverse transforming unit 1305 (step S1510).

On the other hand, as for shots that are to refer to other similar shots such as "A1" to "A4" in FIG. 1 (step S1504: NO), a method of reference similar shot generation is determined by the generating method determining unit (step S1505), then a reference similar shot is generated at the reference similar shot generating unit 1310 (step S1506), and difference between target similar shot and the reference similar shot, i.e., difference similar shot is generated (step S1507). The difference similar shot is then transformed/quantized at the transforming unit 1300/quantizing unit 1301 (step S1508), is entropy coded at the entropy coding unit 1302 (step S1509), and is local-decoded (inverse-quantized and inverse-transformed) by the inverse quantizing unit 1304 and the inverse transforming unit 1305 (step S1510).

At the time coding of the entire shots of image has completed (step S1503: YES), a process indicated by this flowchart is closed. Reference similar shot generating information corresponding to a generating method determined at the generating method determining unit 1309 is also coded by the entropy coding unit 1302, and is then multiplexed with a shot coding stream (coding data for each shot) from the quantizing unit 1301 composing a single coding stream. The multiplexing method is not particularly considered in the present invention. Since the necessity of multiplexing a shot coding stream and reference similar shot generating information depends on an application, it is possible to transmit these as separate streams without multiplexing.

Thus the present invention is appropriate for image coding in the fields where multi-path image coding is applicable, i.e., the delay of coding is not problematic as shot separating/categorization is done first by scanning the entire object image. As application examples, image coding for circulating medium (next generation optical disk, etc.) and the transcoding of contents stored on a storing medium (data volume compression, moving to a memory card, etc.) are cited. The present invention can also be used for broad band streaming and for the image coding of recorded (coded) programs for broadcasting.

Figure 16:
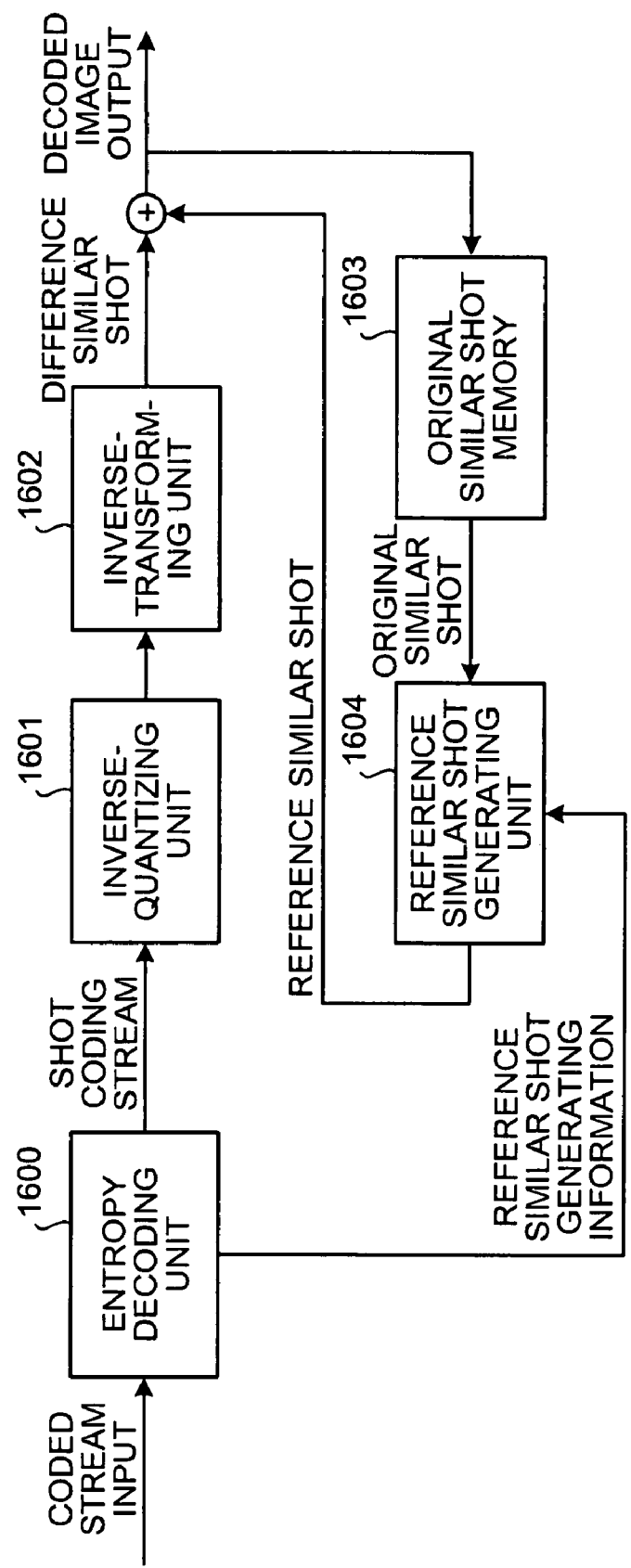
FIG. 16 is a an explanatory diagram showing an example of a configuration of an image processing apparatus (decoder) according to the first embodiment of the present invention.

Decoding of the coded image will then be described. FIG. 16 is an explanatory diagram showing an example of a configuration of an image processing apparatus (decoder) according to the first embodiment of the present invention. Numeral 1600 denotes an entropy decoding unit that decodes coded stream input and that outputs a decoded shot coding stream and reference similar shot generating information to an inverse quantizing unit 1601 and to a reference similar shot generating unit 1604, respectively. Numeral 1601 denotes an inverse quantizing unit that inverse-quantizes a shot coding stream, and numeral 1602 denotes an inverse transforming unit that inverse-transforms an inverse-quantized shot coding stream.

Numeral 1603 denotes an original similar shot memory that retains decoded image equivalent to, at least, one shot. Numeral 1604 denotes a reference similar shot generating unit that generates reference similar shot from original similar shot retained at the original similar shot memory 1603 in accordance with reference similar shot generating information input from the entropy decoding unit 1600.

Figure 17:
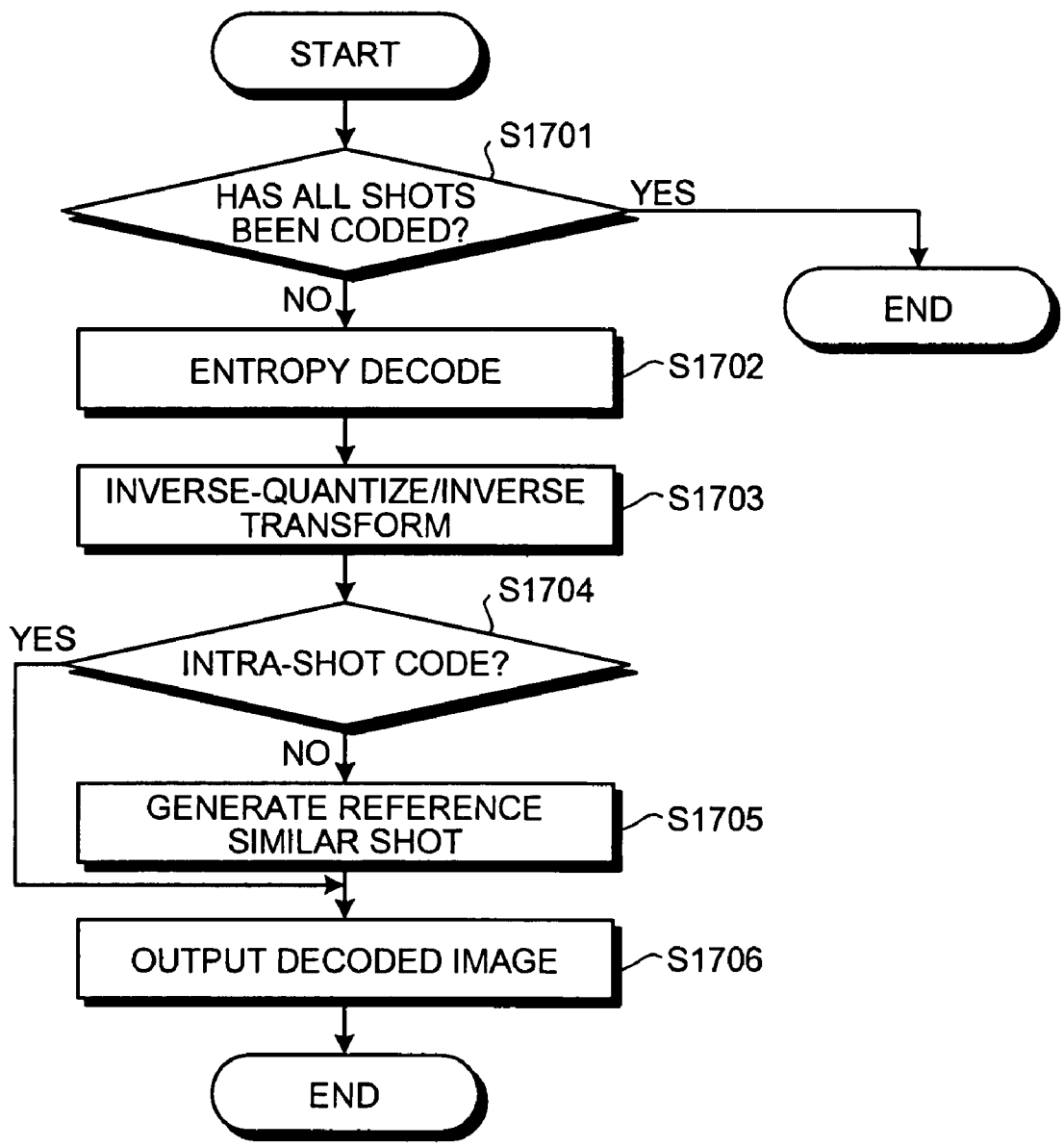
FIG. 17 is a flowchart showing a procedure of an image decoding process by the image processing apparatus (decoder) according to the first embodiment of the present invention.

FIG. 17 is a flowchart showing a procedure of an image decoding process by the image processing apparatus (decoder) according to the first embodiment of the present invention. While unprocessed (not yet decoded) shots are remained (step S1701: NO), this device decodes the shots at the entropy decoding unit 1600 (step S1702), then inverse-quantizes the decoded shots at the inverse quantizing unit 1601 and inverse-transforms at the inverse transforming unit 1602 (step S1703).

Subsequently, if the above shot is coded by intra-shot coding, that is, shot coded without reference to another shot (step S1704: YES), the above inverse-transformed data is output as it is as a decoded image (step S1706). On the other hand, when the above shot is coded referring to another shot (step S1704: NO), the reference similar shot generating unit 1604 generates reference similar shot from decoded image (original similar shot) retained at the original similar shot memory 1603 in accordance with reference similar shot generating information input from the entropy decoding unit 1600 (step S1705). The composition of the difference similar shot from the inverse-transforming unit 1602 and the reference similar shot thereof is output as a decoded image (step S1706).

Second Embodiment

Figure 18:
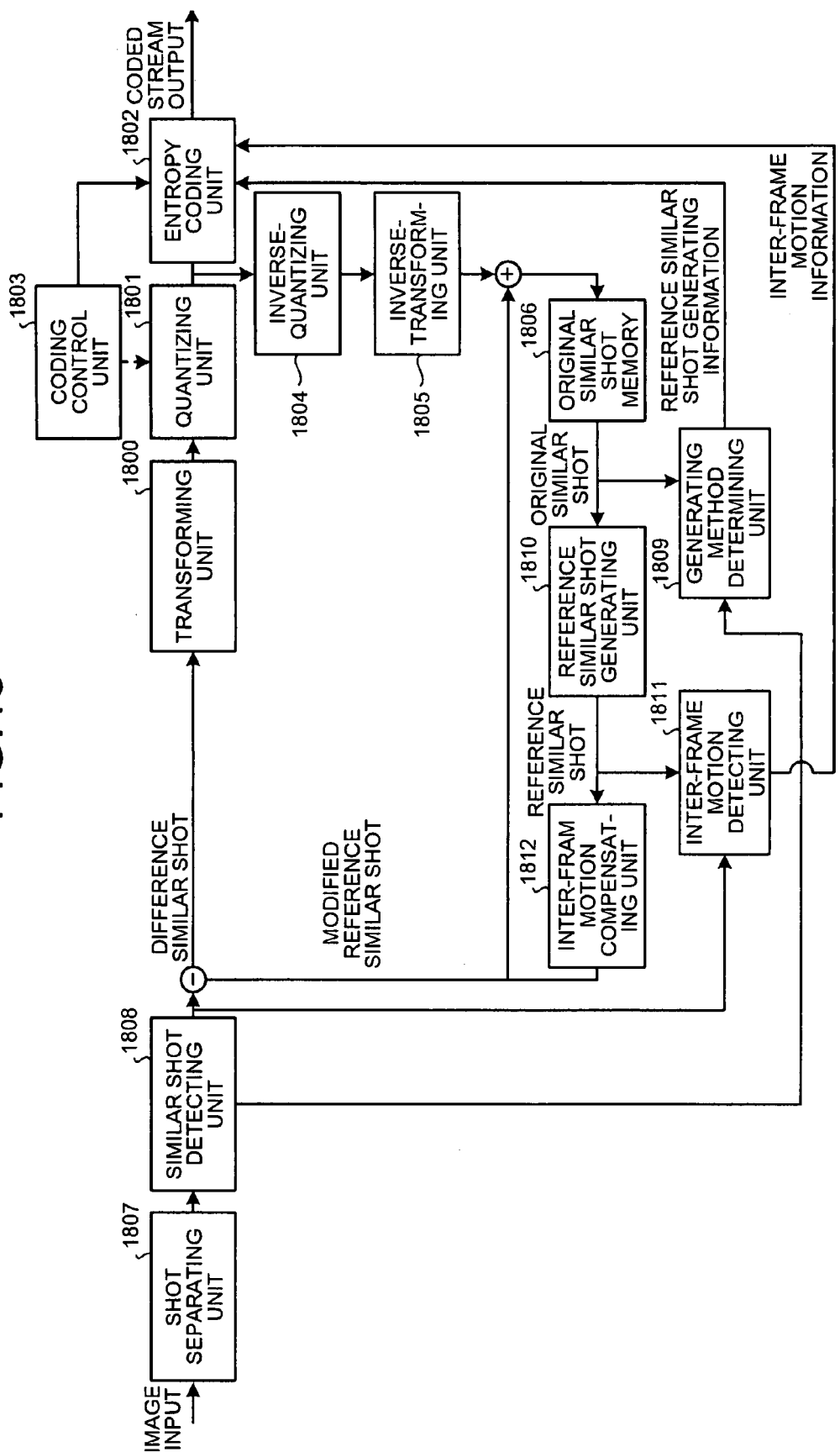
FIG. 18 is an explanatory diagram showing an example of a configuration of an image processing apparatus (encoder) according to a second embodiment of the present invention.
Figure 19:
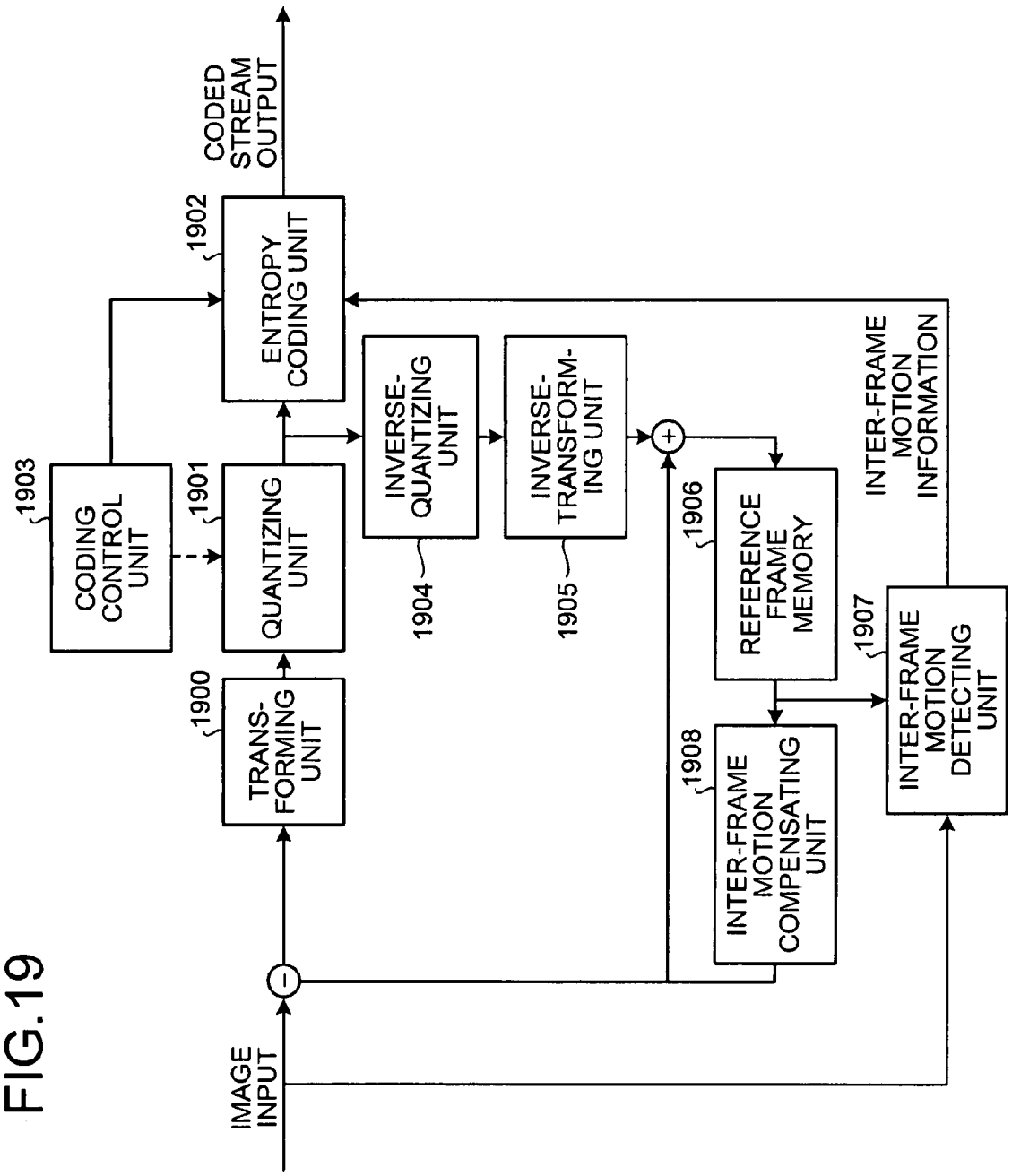
FIG. 19 is an explanatory diagram showing an example of a configuration of a JPEG/MPEG encoder according to the conventional techniques (with motion compensation)

In the first embodiment, the differences between individual frames of the target similar shot and the frames corresponding thereto of the reference similar shot are simply calculated. Further improvement in coding efficiency is expected if motion compensation between the frames is applied. FIG. 18 is an explanatory diagram showing an example of a configuration of an image processing apparatus (encoder) according to a second embodiment of the present invention. FIG. 19 is an explanatory diagram showing an example of a configuration of a JPEG/MPEG encoder according to the conventional techniques (with motion compensation).

FIG. 18 illustrates a configuration of a JPEG/MPEG encoder modified from the conventional encoder by replacing a reference frame memory 1906 with an original similar shot memory 1806 and by adding a shot separating unit 1807, a similar shot detecting unit 1808, generating method determining unit 1809, and a reference similar shot generating unit 1810 (since functions of other units that are not described above, namely, a transforming unit 1800, a quantizing unit 1801, an entropy coding unit 1802, a coding control unit 1803, an inverse quantizing unit 1804, and an inverse transforming unit 1805 are equivalent to the units that have identical names in FIG. 19, that is, the same as conventional techniques, the explanation thereof is omitted). The device can also be regarded as an encoder modified from that for the first embodiment shown in FIG. 13 by adding an inter-frame motion detecting unit 1811 and an inter-frame motion compensating unit 1812.

Although the method of inter-frame motion compensation prediction is not particularly considered in the present invention, two typical conventional methods are explained in the followings.

Figure 20:
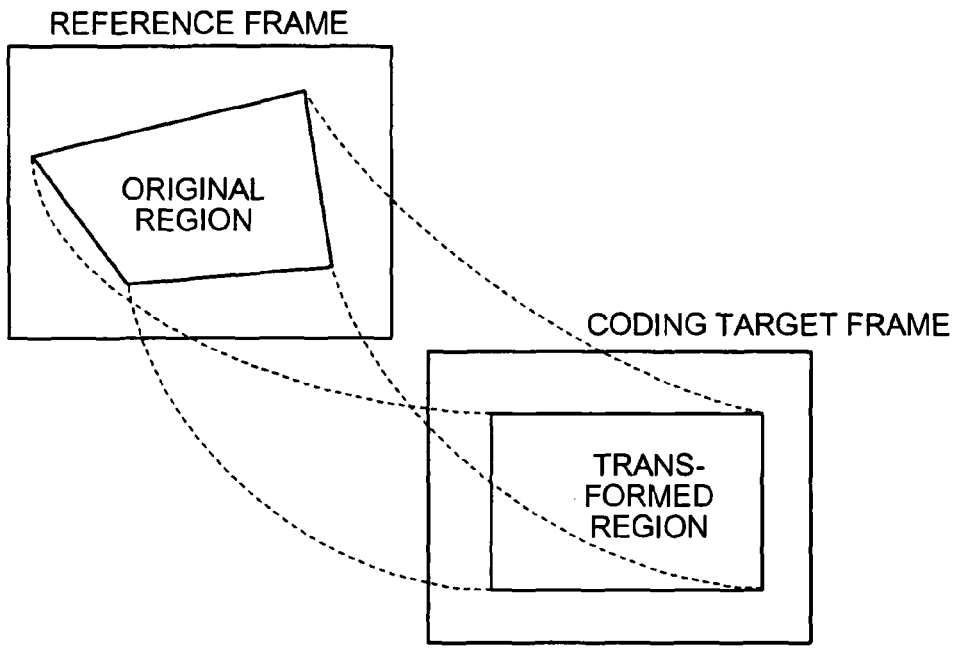
FIG. 20 is an explanatory diagram schematically showing a concept of global motion compensation prediction.

(Inter-Frame Motion Compensation Prediction Method 1)
Global Motion Compensation Prediction (FIG. 20)

This method is for performing warping processes (parallel shifting, magnification/reduction, rotation, affine transformation, perspective transformation, etc.) from a quadrilateral region in a reference frame to a rectangular region in a coding object frame. The "Sprite decoding" in chapter 7.8 of MPEG-4 (ISO/IEC14496-2) is a specific example. By the global motion compensation prediction, the motion of the entire frame can be captured, and therefore, rectification of displacement/deformation of an object in the frame is possible.

Figure 21:
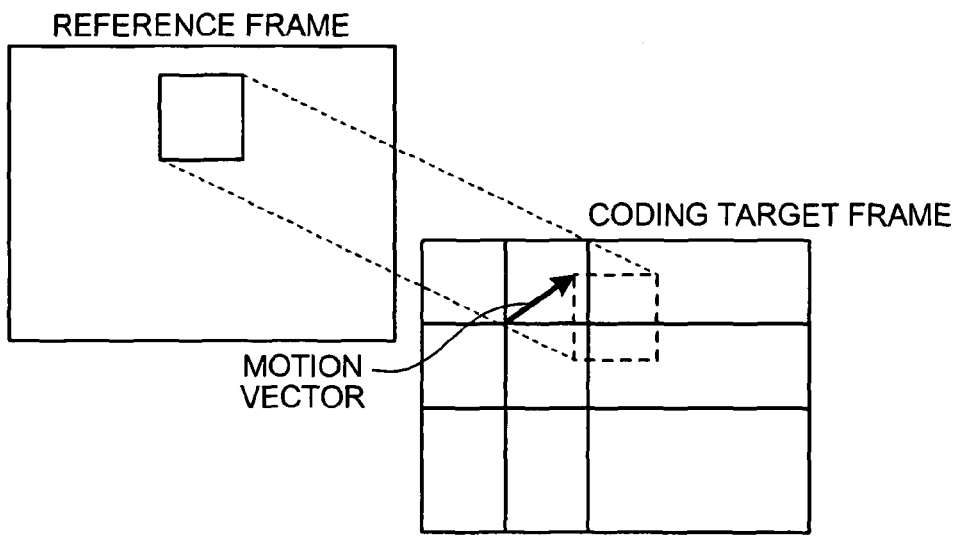
FIG. 21 is an explanatory diagram schematically showing a concept of motion compensation prediction by block.

(Inter-Frame Motion Compensation Prediction Method 2)
Block Motion Compensation Prediction (FIG. 21)

This method is for performing warping process per block in the same fashion with method 1 after separating a coding object frame into square blocks. In the case of parallel shifting as an example of the warping process, a region with the minimum error is searched for individual blocks in a reference frame, and displacements between individual blocks in a coding object frame and each corresponding regions located in a reference frame are transmitted as motion vectors. The size of the blocks is 16×16 pixels (referred to as "macro block") for MPEG-1 and MPEG-2. Smaller blocks such as 8×8 pixels and 4×4 pixels are also permissible for MPEG-4 and H.264, respectively. A reference frame is not limited to one but a plurality of reference frames can be referred to for selecting optimal regions. In this case, reference frame IDs in addition to motion vector information are required to be transmitted. By the block motion compensation prediction, the motion of a local object in a frame can be detected and processed.

Figure 22:
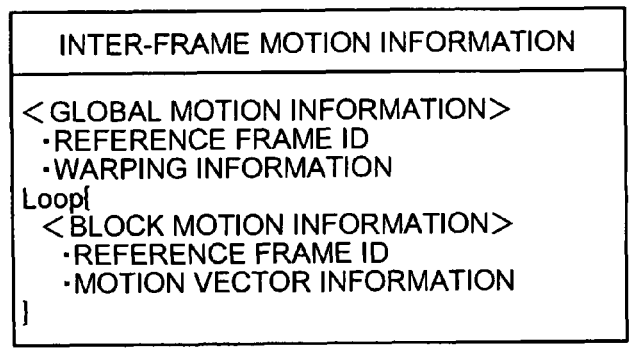
FIG. 22 is a schematic diagram showing specific examples of inter-frame motion information.

A concrete example of inter-frame motion information that is necessary at decoding (need to be included in a coding stream) when the inter-frame motion compensation prediction is performed is shown in FIG. 22. While both global motion prediction and block motion prediction are used in combination in the shown example, it is also permissible to use either one of them.

More concrete explanation of a method of inter-frame motion compensation is described below. Inter-frame motion information (affine transformation coefficient, motion vector information, etc., for example) between each frame of the target similar shot, and at least, one frame of the reference similar shot is calculated by the inter-frame motion detecting unit 1811, and then each frame of modified reference similar shot (prediction frame corresponding to each frame of the target similar shot) is generated from the reference similar shot in accordance with the inter-frame motion information at the inter-frame motion compensation unit 1812.

If frame positions of the target similar shot and the reference similar shot correspond with each other, frame positions of the target similar shot and the modified reference similar shot also correspond with each other. Therefore, difference simply obtained by subtracting each frame in the modified reference similar shot from each corresponding frame in the target similar shot can be coded. In other words, the values of the difference similar shot are concentrated in near zero by further enhancing similarity between the reference similar shot and the target similar shot by motion compensation prediction. The inter-frame motion information and shot coding stream are composed as a single stream by multiplexing.

On the other hand, if frame positions of the target similar shot and the reference similar shot do not correspond with each other, a process for the modification of frame positions is required, and the following two examples can be given. However, methods of generating modified reference similar shot are not limited to the following description.

Figure 23:
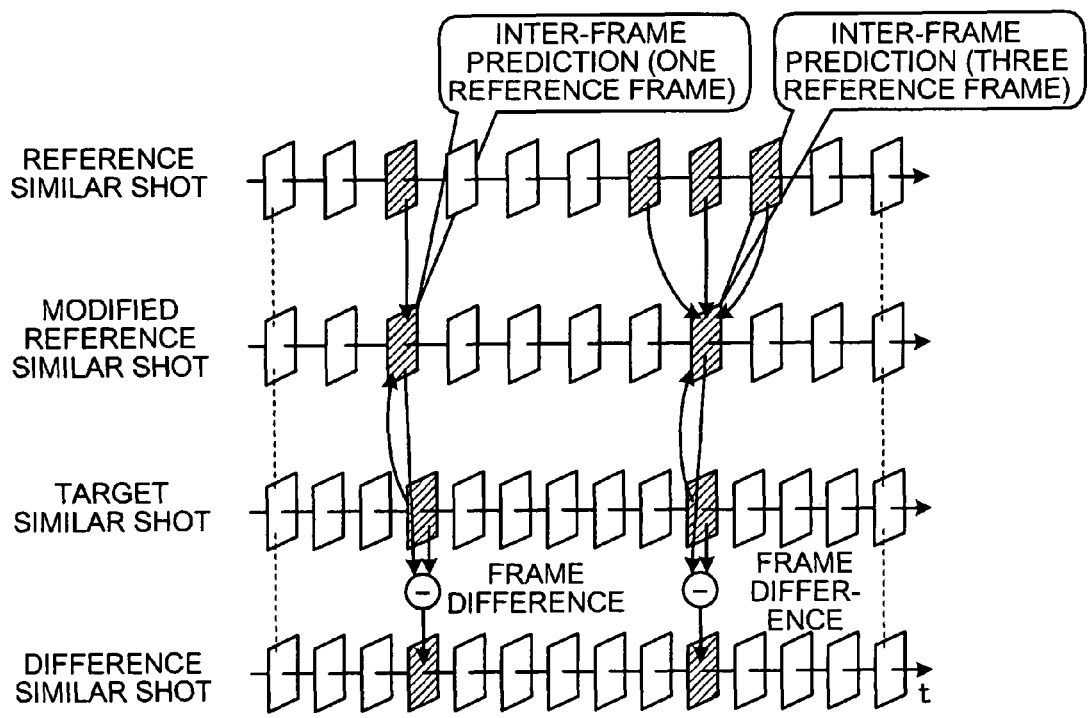
FIG. 23 is an explanatory diagram schematically showing a method of generating corrected reference similar shots (without frame position compensation)

(Generation of Modified Reference Similar Shot Method 1)
without Frame Position Modification As shown in FIG. 23, motion detection is performed between each frame of the target similar shot and, at least, one corresponding frame in the reference similar shot. Subsequently, each frame of the modified reference similar shot is generated by performing inter-frame motion compensation on the reference similar shot based on inter-frame motion information obtained. The position of each frame of the modified reference similar shot is the same as that of the reference similar shot (frame positions of the reference similar shot are conserved). In this case, difference, for example, between a frame of the modified reference similar shot that is closest in time to the target frame of the target similar shot and the target frame is coded.

Figure 24:
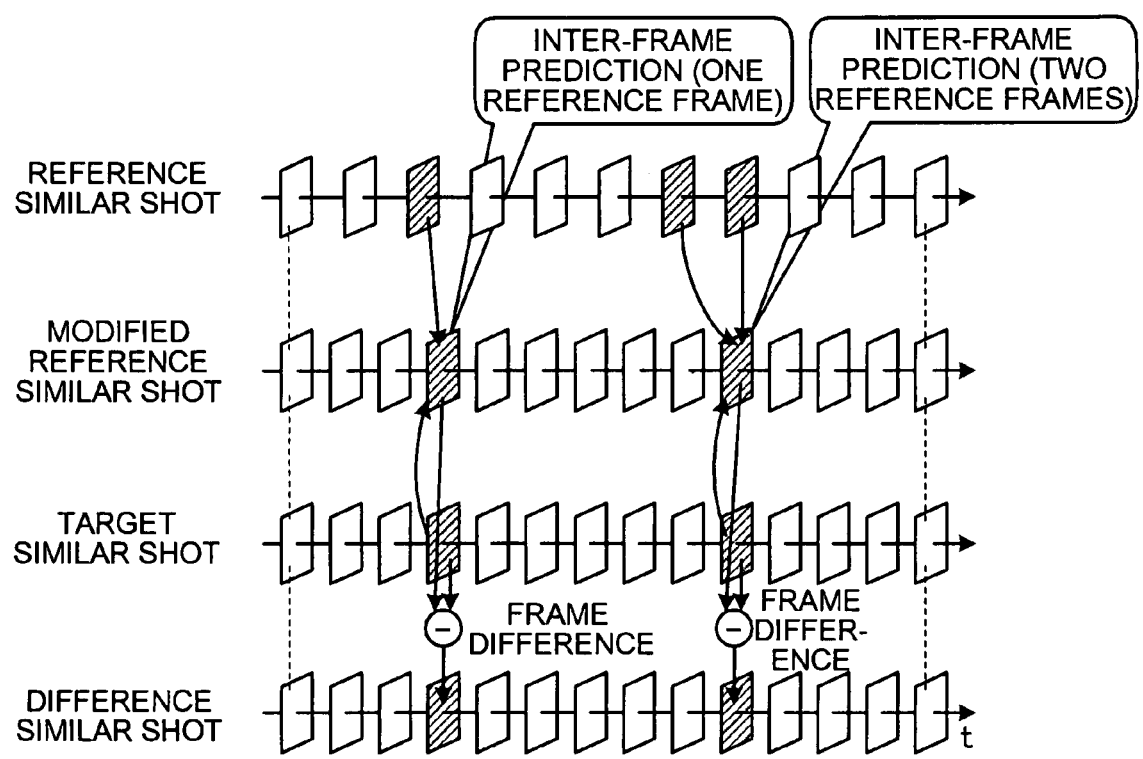
FIG. 24 is an explanatory diagram schematically showing a method of generating corrected reference similar shots (with frame position compensation)

(Generation of Modified Reference Similar Shot Method 2)
with Frame Position Modification As shown in FIG. 24, while each frame of the modified reference similar shot is generated by inter-frame motion compensation as is in method 1, the positions of individual frames of the modified reference similar shot are modified (interpolation or thinning) to correspond with those of the target similar shot. In this case, difference between individual frames of the target similar shot and each frame of the modified reference similar shot located at corresponding positions are coded.

Figure 25:
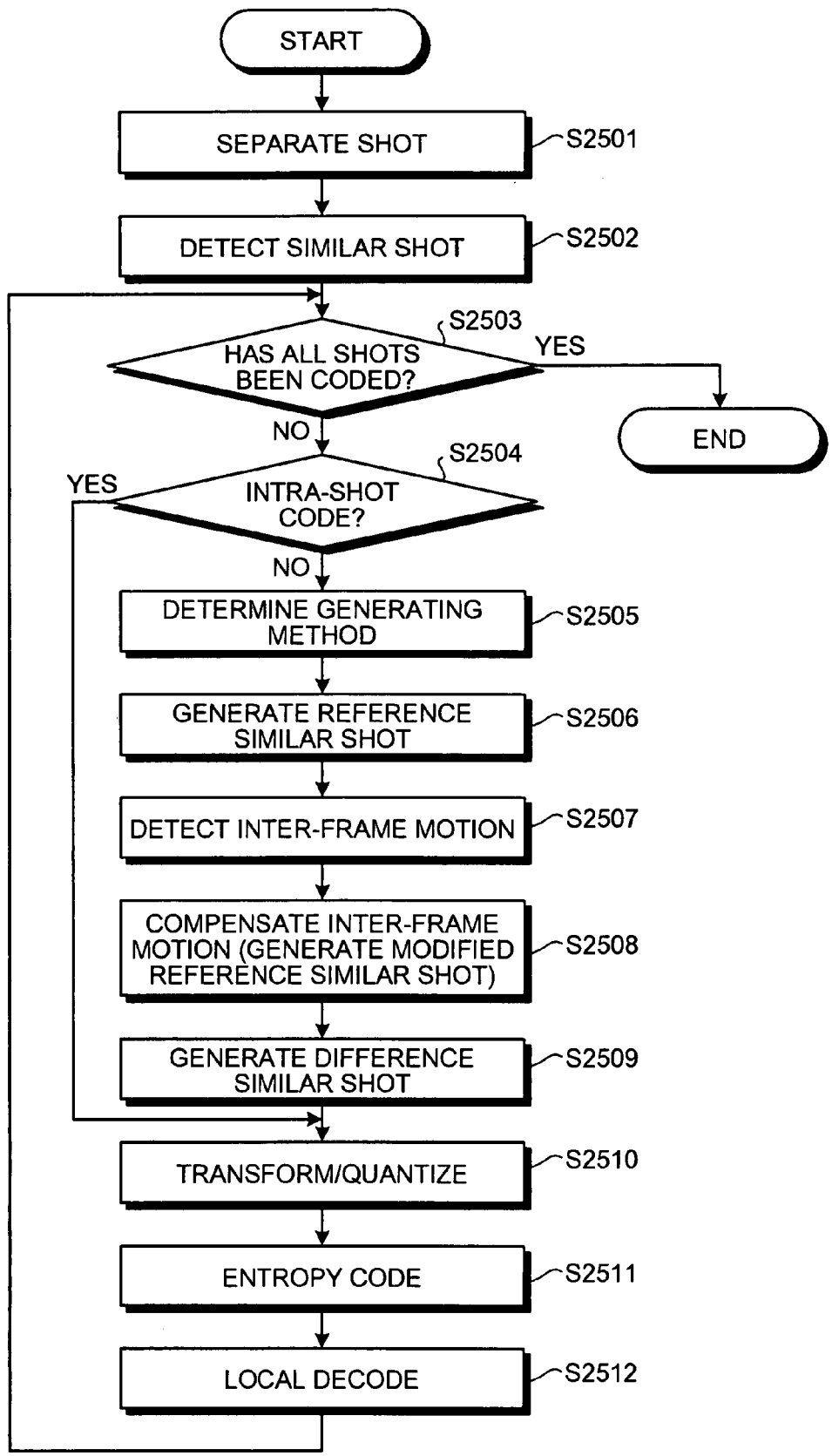
FIG. 25 is a flowchart showing a procedure of an image coding process by the image processing apparatus (encoder) according to the second embodiment of the present invention.

FIG. 25 is a flowchart showing a procedure of an image coding process by the image processing apparatus (encoder) according to the second embodiment of the present invention. Difference from the image coding process of the first embodiment shown in FIG. 15 is a point that inter-frame motion detecting process (step S2507) and the inter-frame motion compensation process/modified reference similar shot generating process (step S2508) are added after generating reference similar shot (step S2506). A difference similar shot is then generated by subtracting the modified reference similar shot generated at the step S2508 from the target similar shot (step S2509). Each process at steps other than S2507 to 2509, namely, steps S2501 to S2506 and steps S2510 to 2512, are equivalent to those steps with the identical names shown in FIG. 15.

Figure 26:
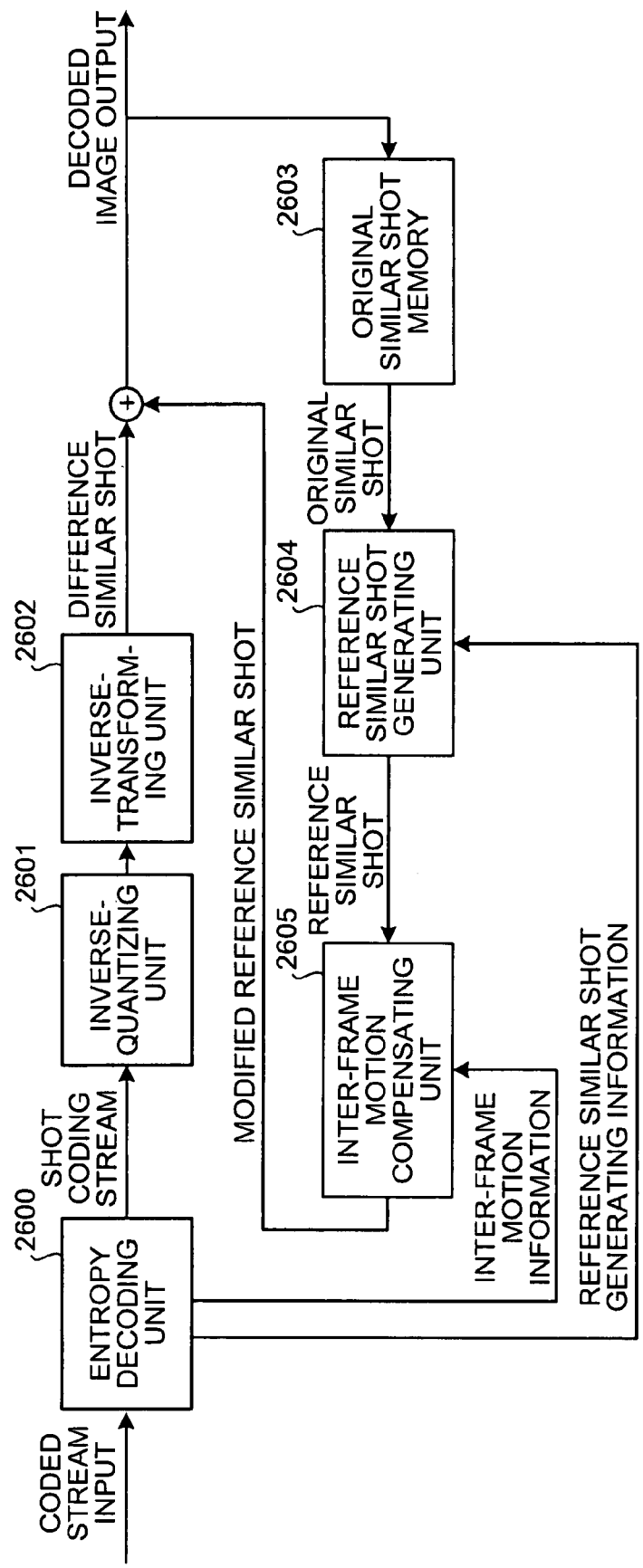
FIG. 26 is an explanatory diagram showing an example of a configuration of an image processing apparatus (decoder) according to the second embodiment of the present invention.

The decoding of image that is coded will then be described. FIG. 26 is a schematic showing an example of the configuration of an image processing apparatus (decoder) according to the second embodiment of the present invention. Difference from the decoder for the first embodiment shown in FIG. 16 is a point that an inter-frame motion compensating unit 2605 that generates modified reference similar shot by motion compensation prediction from reference similar shot generated at a reference similar shot generating unit 2604 is added. As the functions of other units than the inter-frame motion compensating unit 2605, i.e., an entropy decoding unit 2600, an inverse quantizing unit 2601, an inverse transforming unit 2602, an original similar shot memory 2603, and the reference similar shot generating unit 2604 are equivalent with those units with the identical names in FIG. 16, their explanations are omitted.

Figure 27:
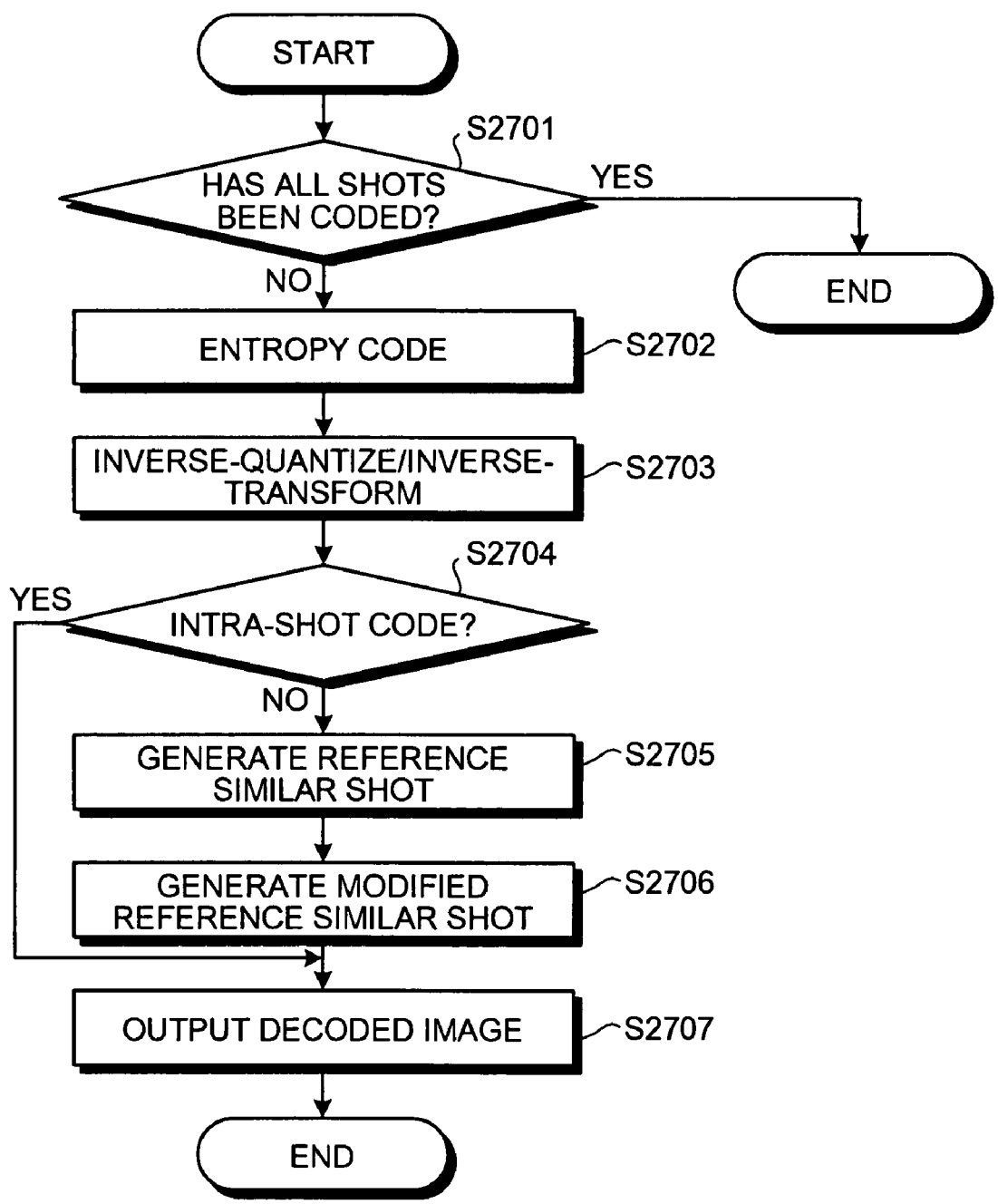
FIG. 27 is a flowchart showing a procedure of an image decoding process by the image processing apparatus (decoder) according to the second embodiment of the present invention.

FIG. 27 is a flowchart showing the protocol of image decoding process at an image processing apparatus (decoder) according to the second embodiment of the present invention. A different point from the image decoding process of the first embodiment shown in FIG. 17 is that modified reference similar shot generating process (step S2706) is added after generating reference similar shot (step S2705). A difference similar shot (including modified reference similar shot from the inter-frame motion compensating unit 2605) from the inverse transforming unit 2602 is then output as decoded image (step S2707). Processes at steps other than S2706 and 2707, namely, steps S2701 to S2705, are equivalent to those steps with the identical names in FIG. 17.

In accordance with the first embodiment, as only the differences of individual shots in an image from the similar shots corresponding thereto are coded, and further with the second embodiment, as motion of each frame are also taken into account, it is predicted that differences between the target frames and the reference frames concentrate in near zero, and thus, a coding volume can be reduced.

The above functions advantageous in terms of reduction of a coding volume, however, there also is a disadvantage such as reduced random accessibility. In the decoders shown in FIGS. 16 and 26, for example, as the reference similar shot is required to decode a certain shot, the original similar shot for generating the reference similar shot is required to be decoded in advance, and for the decoding of the original similar shot, the reference similar shot and the original similar shot for this reference similar shot are further required. For avoiding such chain-like tracing for references, it can be considered that the shot coding system (intra-shot coding) that does not use reference similar shot is inserted at certain intervals. This provides a function equivalent to I-picture in MPEG, for example.

The encoder according to the first or the second embodiment can be implemented by a conventional JPEG/MPEG encoder. In this case, existing hardware (for example, LSI chip) is required to be modified.

Figure 28:
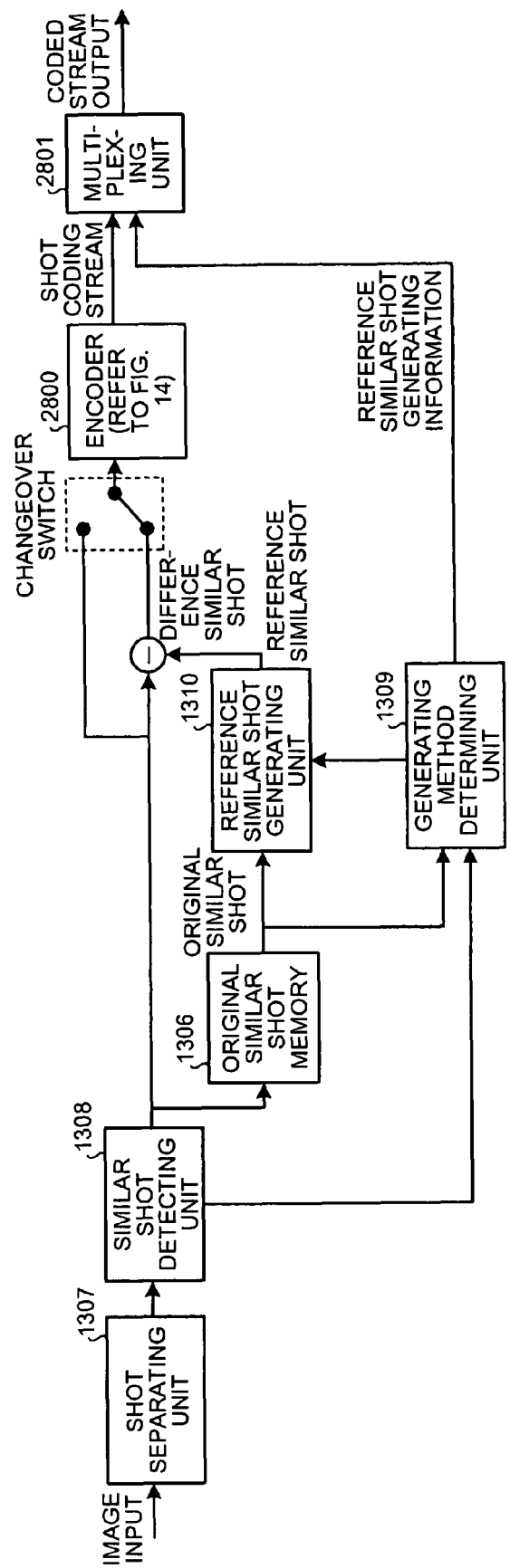
FIG. 28 is a schematic diagram showing another example of the configuration of the image processing apparatus (encoder) according to the first embodiment of the present invention (by using the encoder adopted in the conventional techniques)
Figure 29:
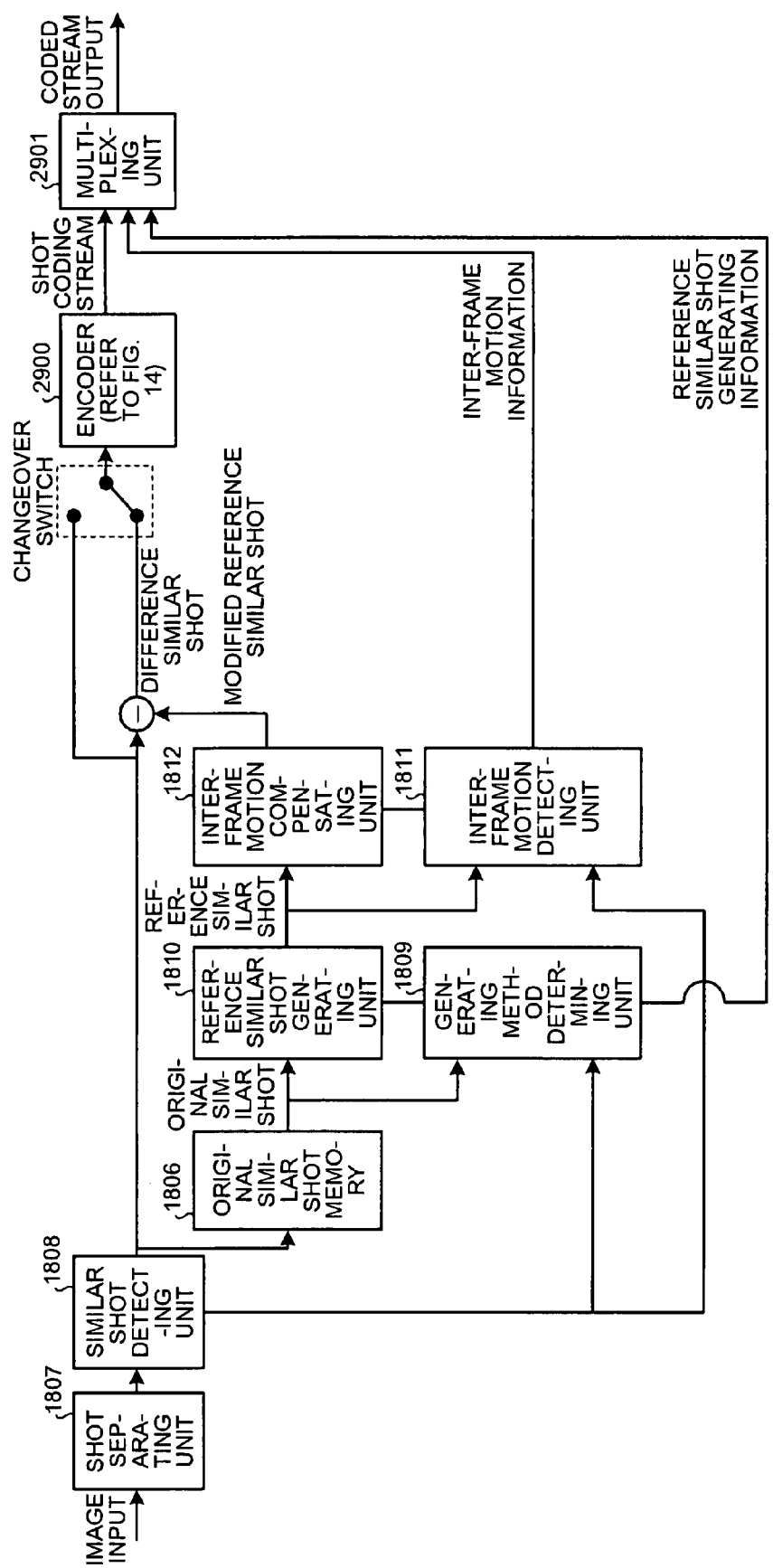
FIG. 29 is a schematic diagram showing another example of the configuration of the image processing apparatus (encoder) according to the second embodiment of the present invention (by using the encoder adopted in the conventional techniques)

As shown in FIGS. 28 and 29, for example, an encoder according to the present invention can be implemented by externally providing required functional units to a conventional encoder 2800/2900. FIGS. 28 and 29 correspond to FIG. 13 of the first embodiment and FIG. 18 of the second embodiment, respectively. Specifically, the reference similar shot or the difference similar shot obtained by subtracting the modified reference similar shot from the former is input to the encoder 2800/2900 by providing the original similar shot memory 1306/1806, the shot separating unit 1307/1807, the similar shot detecting unit 1308/1808, the generating method determining unit 1309/1809, the reference similar shot generating unit 1310/1810, or further in the case of FIG. 29, the inter-frame motion detecting unit 1811 and the inter-frame motion compensating unit 1812, before the encoder 2800/2900, and a shot coding stream, reference similar shot generating information, and inter-frame motion information are multiplexed by providing a plurality of multiplexing units 2801/2901 (if multiplexing is necessary).

AS shown in FIGS. 28 and 29, conventional encoders and coding methods for, for example, MPEG-1/2/4 and H.264 can be applied without modification by performing the reference similar shot generating process prior to a coding loop. However, there are disadvantages of the configuration illustrated in the figures such as the redundancy of a process between motion prediction for the reference similar shot generation and motion prediction for coding, and difficulty to optimize an encoder both for reference similar shot generation and for the compression of difference similar shot.

Figure 30:
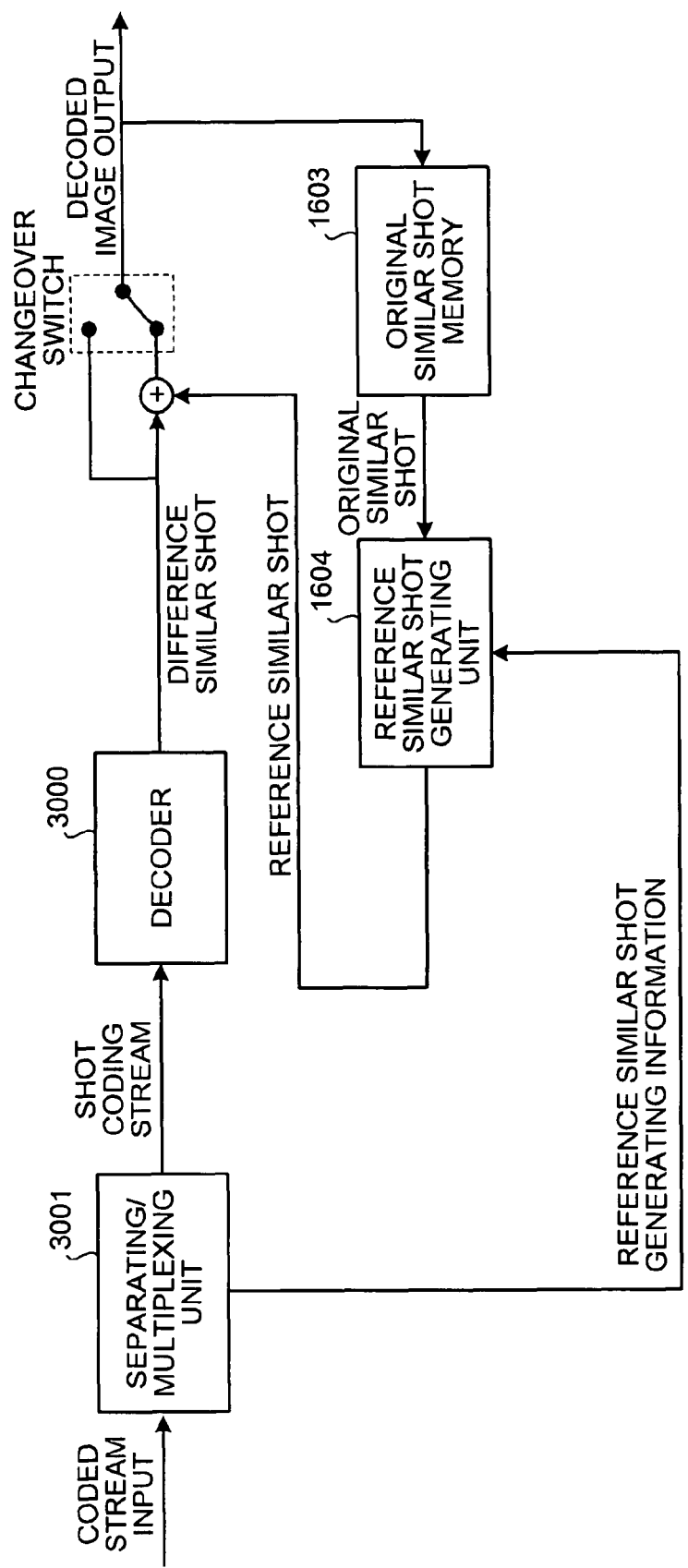
FIG. 30 is a schematic diagram showing another example of the configuration of the image processing apparatus (decoder) according to the first embodiment of the present invention (by using the decoder adopted in the conventional techniques)
Figure 31:
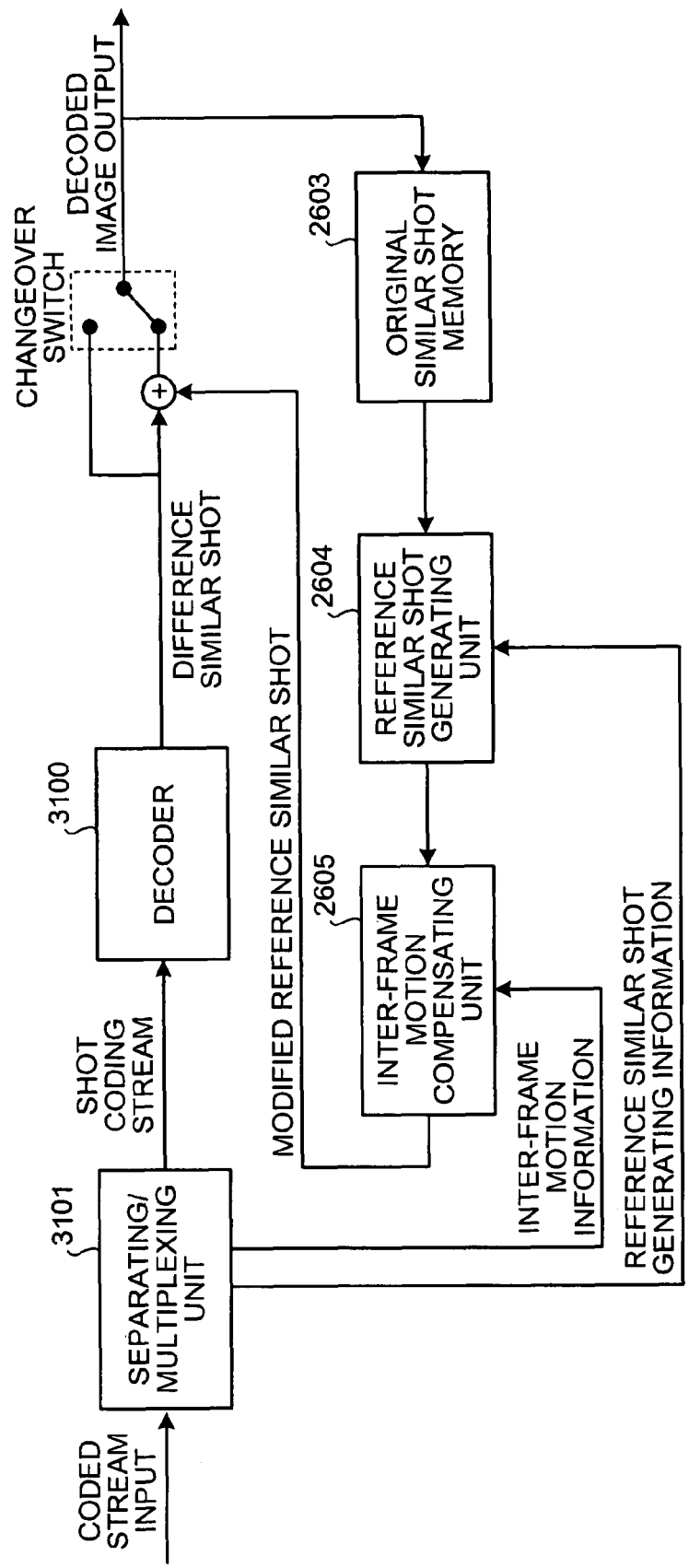
FIG. 31 is a schematic diagram showing another example of the configuration of the image processing apparatus (decoder) according to the second embodiment of the present invention (by using the decoder adopted in the conventional techniques).

FIGS. 30 and 31 illustrate examples of implementation of the decoder according to the present invention by externally providing required functional units to a conventional decoder 3000/3100. FIGS. 30 and 31 correspond to FIG. 16 of the first embodiment and FIG. 26 of the second embodiment, respectively. Specifically, a shot coding stream, reference similar shot generating information, and inter-frame motion information are separated from a coding stream input to a separating/multiplexing unit 3001/3101 that is provided at a preceding stage to the encoder 3000/3100, and a reference similar shot or a modified reference similar shot is added to a difference similar shot output from the decoder 3000/3100 by providing the original similar shot memory 1603/2603, the reference similar shot generating unit 1604/2604, or further in the case of FIG. 31, the inter-frame motion compensating unit 2605 after the encoder 3000/3100.

Thus, according to the inventions described in claims 1, 9, and 17, the data volume of a coding stream can be reduced since differences between similar frames are coded based on the similarity (redundancy) of multiple shots that compose coding object image. According to the inventions described in claims 2, 10, and 18, as frame positions of the target similar shot and the reference similar shot correspond with each other, the later processes (calculation of inter frame difference, etc.) are simplified. According to the inventions described in claims 3, 11, and 19, shots similar to multiple shots like the case of crossfading can be coded efficiently. According to the inventions described in claims 4, 5, 12, 13, 20, and 21, the data volume of a coding stream can be reduced even similarity is not necessarily given between the entire original similar shot and target similar shot as predictive coding is performed only for an interval(s) in original similar shot with good matching with target similar shot or vice versa. According to the inventions described in claims 6, 14, and 22, as motion compensation is performed between similar shots, differences between the frames can be further concentrated in the vicinity of zero (thus the data volume of a coding stream can be further reduced) by modifying the replacement/deformation of objects in the frame.

According to the invention described in claims 7, 15, and 23, video image coded by the inventions described in claims 1 to 5, 9 to 13, or 17 to 21 can be decoded. According to the invention described in claims 8, 16, and 24, video image coded by the inventions described in claims 6, 14, and 22 can be decoded.

The image processing methods explained in the present embodiment can be implemented by executing a program prepared in advance on a processing unit such as a processor and a microcomputer. The program is recorded on any recording medium, such as ROM, HD, FD, CD-ROM, CD-R, CD- RW, MO, and DVD, that is readable by the processing unit, and is read out and executed by the processing unit. The program can also be a transmission medium that can be distributed via a network such as the internet.

The invention claimed is:

1. An image processing apparatus comprising:
   a shot separating unit that separates a video image into a plurality of shots composed of sequences of a plurality of frames;
   a shot detecting unit that detects a second shot that is similar to a first shot to be coded among the shots;
   a shot creating unit that creates a third shot by modifying a length of time of the second shot; and
   a coding unit that codes data corresponding to a difference between the first shot and the third shot.

2. The image processing apparatus according to claim 1, wherein the shot creating unit modifies the length of time of the second shot such that positions of frames in the third shot coincide with positions of frames in the first shot.

3. The image processing apparatus according to claim 1, wherein the shot creating unit creates the third shot by weighted-averaging a plurality of the second shots for which the length of time has been modified.

4. The image processing apparatus according to claim 1, wherein the shot creating unit creates the third shot by using partial intervals of the second shot.

5. The image processing apparatus according to claim 1, wherein the shot creating unit creates the third shot by using partial intervals of the first shot.

6. The image processing apparatus according to claim 1, further comprising a second shot creating unit that creates a fourth shot by motion-compensating the third shot, wherein
   the coding unit codes data corresponding to a difference between the first shot and the fourth shot.

7. An image processing apparatus comprising:
   a shot decoding unit that decodes coded data of a first shot composed of sequences of a plurality of frames, among coded data of a video image;
   a shot creating unit that creates a third shot by modifying a length of time of a second shot that is similar to the first shot and by decoding coded data corresponding to a difference of the second shot and the first shot, that is included in the video image, by a method specified by shot creating information included in the coded data; and
   a shot adding unit that adds the coded data that has been decoded of the first shot to decoded data of the third shot.

8. The image processing apparatus according to claim 7, further comprising a second shot creating unit that creates a fourth shot by motion-compensating the third shot, wherein
   the shot adding unit adds the coded data that has been decoded to the fourth shot.

9. An image processing method comprising:
   separating, by a processor, a video image into a plurality of shots composed of sequences of a plurality of frames;
   detecting a second shot that is similar to a first shot to be coded among the shots; creating a third shot by modifying a length of time of the second shot; and
   coding data corresponding to a difference between the first shot and the third shot.

10. The image processing method according to claim 9, wherein the length of time of the second shot is modified such that positions of frames in the third shot coincide with positions of frames in the first shot.

11. The image processing method according to claim 9, wherein the creating includes creating the third shot by weighted-averaging a plurality of the second shots for which the length of time has been modified.

12. The image processing method according to claim 9, wherein the creating includes creating the third shot by using partial intervals of the second shot.

13. The image processing method according to claim 9, wherein the creating includes creating the third shot by using partial intervals of the first shot.

14. The image processing method according to claim 9, further comprising creating a fourth shot by motion-compensating the third shot, wherein
   the coding includes coding data corresponding to a difference between the first shot and the fourth shot.

15. An image processing method comprising:
   decoding, by a processor, coded data of a first shot composed of sequences of a plurality of frames, among coded data of a video image;
   creating a third shot by modifying a length of time of a second shot that is similar to the first shot and by decoding coded data corresponding to a difference of the second shot and the first shot, that is included in the video image, by a method specified by shot creating information included in the coded data; and
   adding the coded data that has been decoded of the first shot to decoded data of the third shot.

16. The image processing method according to claim 15, further comprising creating a fourth shot by motion-compensating the third shot, wherein
   the adding includes adding the coded data that has been decoded to the fourth shot.

17. A non-transitory computer-readable recording medium that stores therein a computer program for realizing an image processing method on a computer, the computer program causing the computer to execute: separating a video image into a plurality of shots composed of sequences of a plurality of frames; detecting a second shot that is similar to a first shot to be coded among the shots; creating a third shot by modifying a length of time of the second shot; and coding a difference between the first shot and the third shot.

18. The non-transitory computer-readable recording medium according to claim 17, wherein the length of time of the second shot is modified such that positions of frames in the third shot coincide with positions of frames in the first shot.

19. The non-transitory computer-readable recording medium according to claim 17, wherein the creating includes creating the third shot by weighted-averaging a plurality of the second shots for which the length of time has been modified.

20. The non-transitory computer-readable recording medium according to claim 17, wherein the creating includes creating the third shot by using partial intervals of the second shot.

21. The non-transitory computer-readable recording medium according to claim 17, wherein the creating includes creating the third shot by using partial intervals of the first shot.

22. The non-transitory computer-readable recording medium according to claim 17, wherein the computer program further causes the computer to execute creating a fourth shot by motion-compensating the third shot, wherein the coding includes coding data corresponding to a difference between the first shot and the fourth shot.

23. A non-transitory computer-readable recording medium that stores therein a computer program that realizes an image processing method on a computer, the computer program causing the computer to execute:

decoding coded data of a first shot composed of sequences of a plurality of frames, among coded data of a video image;

creating a third shot by modifying a length of time of a second shot that is similar to the first shot and by decoding coded data corresponding to a difference of the second shot and the first shot, that is included in the video image, by a method specified by shot creating information included in the coded data; and adding the coded data that has been decoded of the first shot to decoded data of the third shot.

24. The non-transitory computer-readable recording medium according to claim 23, wherein the computer program further causes the computer to execute creating a fourth shot by motion-compensating the third shot, wherein the adding includes adding the coded data that has been decoded to the fourth shot.

* * * * *